(12) United States Patent
Whitlock et al.

(10) Patent No.: US 9,291,187 B2
(45) Date of Patent: Mar. 22, 2016

(54) NUT, WASHER AND FASTENER HEAD FOR ELECTROMAGNETIC EFFECT PROTECTION

(71) Applicant: The Boeing Company, Chicago, IL (US)

(72) Inventors: Richard P. Whitlock, Seattle, WA (US); Peter A. Coronado, Renton, WA (US); Sean D. Morden, Federal Way, WA (US); Julie M. Drexler, Renton, WA (US); Randall A. Rogers, Auburn, WA (US); Mark A. Woods, Renton, WA (US); Thomas J. Lowe, Kent, WA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 13/898,074

(22) Filed: May 20, 2013

(65) Prior Publication Data

US 2014/0338179 A1    Nov. 20, 2014

(51) Int. Cl.
| | |
|---|---|
| *F16B 33/00* | (2006.01) |
| *B23G 9/00* | (2006.01) |
| *B64D 45/02* | (2006.01) |
| *F16B 5/02* | (2006.01) |
| *F16B 1/00* | (2006.01) |

(52) U.S. Cl.
CPC ............... *F16B 33/004* (2013.01); *B23G 9/00* (2013.01); *B64D 45/02* (2013.01); *F16B 5/02* (2013.01); *F16B 2001/0064* (2013.01); *Y10T 29/49948* (2015.01)

(58) Field of Classification Search
CPC .. F16B 33/00; F16B 33/004; F16B 2037/007; B23G 9/00; B23G 9/008

USPC ............................... 411/366.1, 368, 369, 370
See application file for complete search history.

(56) References Cited

U.S. PATENT DOCUMENTS

| | | | |
|---|---|---|---|
| 765,139 A * | 7/1904 | Hirsch | 411/368 |
| 3,298,725 A * | 1/1967 | Boteler | 403/282 |
| 3,541,917 A * | 11/1970 | Vandouwen et al. | 411/368 |
| 3,835,615 A * | 9/1974 | King, Jr. | 403/408.1 |
| 4,630,168 A | 12/1986 | Hunt | |
| 4,979,857 A * | 12/1990 | Wing | 411/5 |
| 5,662,444 A * | 9/1997 | Schmidt, Jr. | 411/369 |
| 5,709,356 A | 1/1998 | Avenet et al. | |
| 7,599,164 B2 | 10/2009 | Heeter et al. | |
| 7,695,226 B2 | 4/2010 | March et al. | |
| 7,755,876 B2 | 7/2010 | Morrill et al. | |
| 8,382,413 B2 * | 2/2013 | Nguyen et al. | 411/383 |
| 8,702,362 B2 * | 4/2014 | Zhu | 411/166 |
| 2009/0147429 A1 | 6/2009 | Hernandez | |
| 2010/0270513 A1 | 10/2010 | Haylock et al. | |
| 2010/0272537 A1 | 10/2010 | Haylock et al. | |
| 2011/0131898 A1 * | 6/2011 | Nies et al. | 52/173.1 |
| 2014/0082922 A1 | 3/2014 | Chalverat | |
| 2014/0169911 A1 * | 6/2014 | Sugimoto et al. | 411/366.1 |

FOREIGN PATENT DOCUMENTS

EP    2500273 A2    9/2012

* cited by examiner

*Primary Examiner* — Roberta Delisle
(74) *Attorney, Agent, or Firm* — Felix L. Fischer

(57) ABSTRACT

A fastener system for composite structure providing electromagnetic energy (EME) protection incorporates a fastener having a head with an engagement surface and a shank having a threaded end. A nut is received on the threaded end of the fastener, with the nut also having an engagement surface. At least one of the head engagement surface and the nut engagement surface incorporates a reduced area portion for engagement of a first mating surface or second mating surface, respectively.

31 Claims, 23 Drawing Sheets

NUT, WASHER AND FASTENER HEAD FOR ELECTROMAGNETIC EFFECT PROTECTION

BACKGROUND INFORMATION

1. Field

Embodiments of the disclosure relate generally to the field of fastener technologies for metal fasteners employed in composite structures and more particularly to a fastener system with contact surface shapes in the engaging elements to create a pressure contained system preventing hot particle ejection and edge sparking during lightning conditions.

2. Background

Structural fabrication using composites still requires fasteners for many assembly operations. Metallic fasteners are conductive creating electromagnetic effect (EME) design considerations for lightning strike and other EME issues. Fastener sparking modes must be designed for Lightning conditions include Hot Particle Ejection (HPE) and arcing between an outer surface of the fastener head and other structure or fastener sleeves.

When lightning strikes a Carbon Fiber Reinforced Polymer (CFRP) structure, a significant portion of the current may pass into nearby structures through fasteners. When the electrical energy passes between two surfaces, contact resistance heating may break down the materials and generate hot gas (or plasma) in the hole, or in the space in-between a fastener and an associated internally threaded fastener such as a nut or frangible collar. If the pressure generated is large enough, the gas may find a low pressure path, and escape from the fastener system into a fueled area. That path is sometimes in the surface under the protruding fastener head. These escaping gasses may be hot enough to erode the metal parts (fastener or structure) as they escape, creating particles or droplets known as HPE.

As the lightning strike electrical energy is conducted between structural joints the energy passes through the metallic fasteners. The protruding fastener head of certain fasteners have experienced arcing between the edge of the fastener head and structure in contact with the head. The arcing may be present between fastener head and the structure, or the fastener head and sleeve, if a sleeved fastener is being used.

Existing fastening systems typically require installation of the fastener with the addition of the time and labor intensive processes of installation of premolded caps over fastener heads or other procedures such as removing dielectric coatings from exposed surfaces of the fastener heads.

It is therefore desirable to provide a fastening system suitable for composite structural applications which overcomes both HPE and arcing while overcoming the drawbacks of the prior art fastener installation procedures.

SUMMARY

Embodiments disclosed herein provide a fastener system for composite structure providing electromagnetic energy (EME) protection incorporating a fastener having a head with an engagement surface and a shank having a threaded end. A nut is received on the threaded end of the fastener, with the nut also having an engagement surface. At least one of the head engagement surface and the nut engagement surface incorporates a reduced area portion for engagement of a first mating surface or second mating surface, respectively.

The embodiments disclosed provide a method for EME protection by identifying a hole in a composite structure for insertion of a fastener. A body of a sleeve is the inserted in the hole with a flange contacting the surface of the structure. A fastener having a head with a reduced area engagement surface is inserted into the sleeve with the reduced area portion engaging a mating surface on the sleeve flange or a mating surface on the structure. A nut is then torqued on the fastener.

Fabrication of the embodiments for an EME protection fastener system may be accomplished by forming a fastener shank with a taper. Threads on then created on a first end of the shank and a head having a reduced area engaging surface is formed on a second end of the shank. A multi-faceted wrenchable counter-bore is formed in the shank for counter torque and preventing rotation of the fastener.

The features, functions, and advantages that have been discussed can be achieved independently in various embodiments of the present disclosure or may be combined in yet other embodiments further details of which can be seen with reference to the following description and drawings.

DETAILED DESCRIPTION

The present embodiments provide an EME protecting fastener system employing one or more of a fastener head, washer or nut having a reduced profile engagement surface, one or more endothermic concentric chambers or a double wedge seal ring, used singly or in combination. The mating pieces create a pressure contained system to prevent HPE (high energy sparks) and edge sparking during lightning conditions. Installation of the fastener without additional sealing or processing requirements meets lightning requirements.

Figure 1:
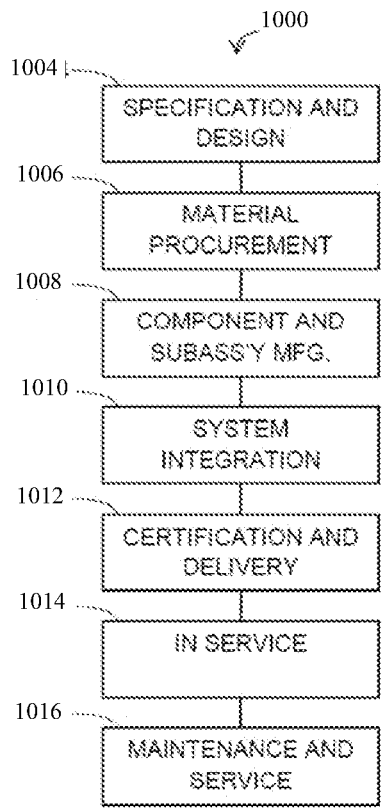
FIG. 1 is a flow diagram of aircraft production and service methodology.
Figure 2:
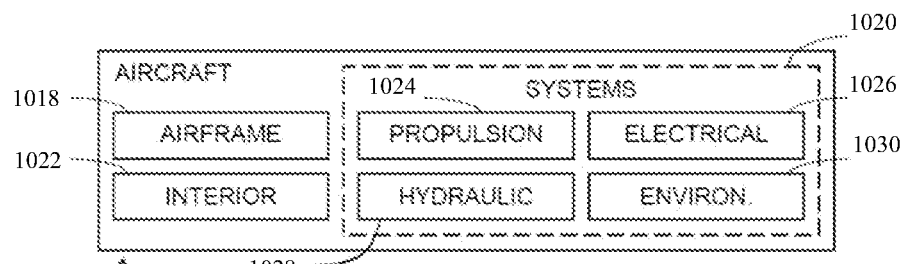
FIG. 2 is a block diagram of an aircraft.

Referring more particularly to the drawings, embodiments of the disclosure may be described in the context of an aircraft manufacturing and service method 1000 as shown in FIG. 1 and an aircraft 1002 as shown in FIG. 2. During pre-production, exemplary method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 102 is scheduled for routine maintenance and service 1016 (which may also include modification, reconfiguration, refurbishment, and so on).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 1002 produced by exemplary method 1000 may include an airframe 1018 with a plurality of systems 1020 and an interior 1022. Examples of high-level systems 1020 include one or more of a propulsion system 1024, an electrical system 1026, a hydraulic system 1026, and an environmental system 1030. Any number of other systems may be included. Although an aerospace example is shown, the principles of the invention may be applied to other industries, such as the automotive industry.

Apparatus and methods embodied herein may be employed during any one or more of the stages of the production and service method 1000. For example, components or subassemblies corresponding to production process 1008 may be fabricated or manufactured in a manner similar to components or subassemblies produced while the aircraft 1002 is in service. Also, one or more apparatus embodiments, method embodiments, or a combination thereof may be utilized during the production stages 1008 and 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation, to maintenance and service 1016.

Figure 3A:
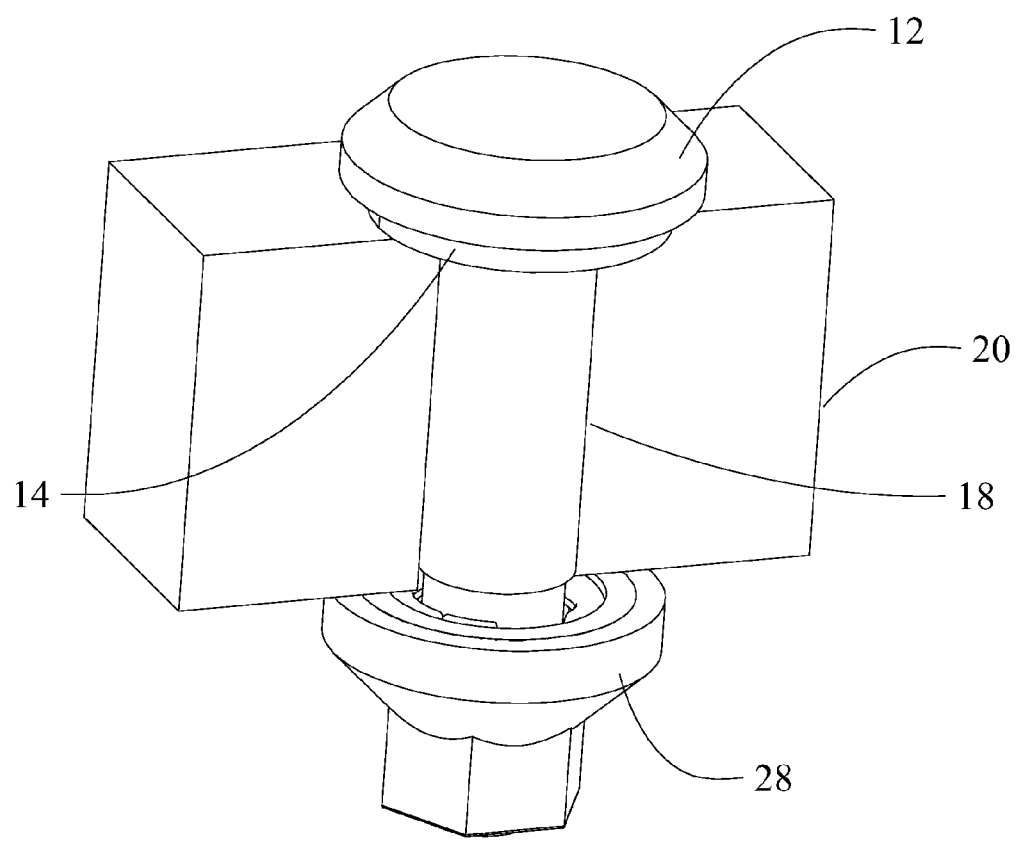
FIG. 3A is an upper isometric view of a fastener system showing the fastener, washer and nut employed in various embodiments disclosed herein.
Figure 3B:
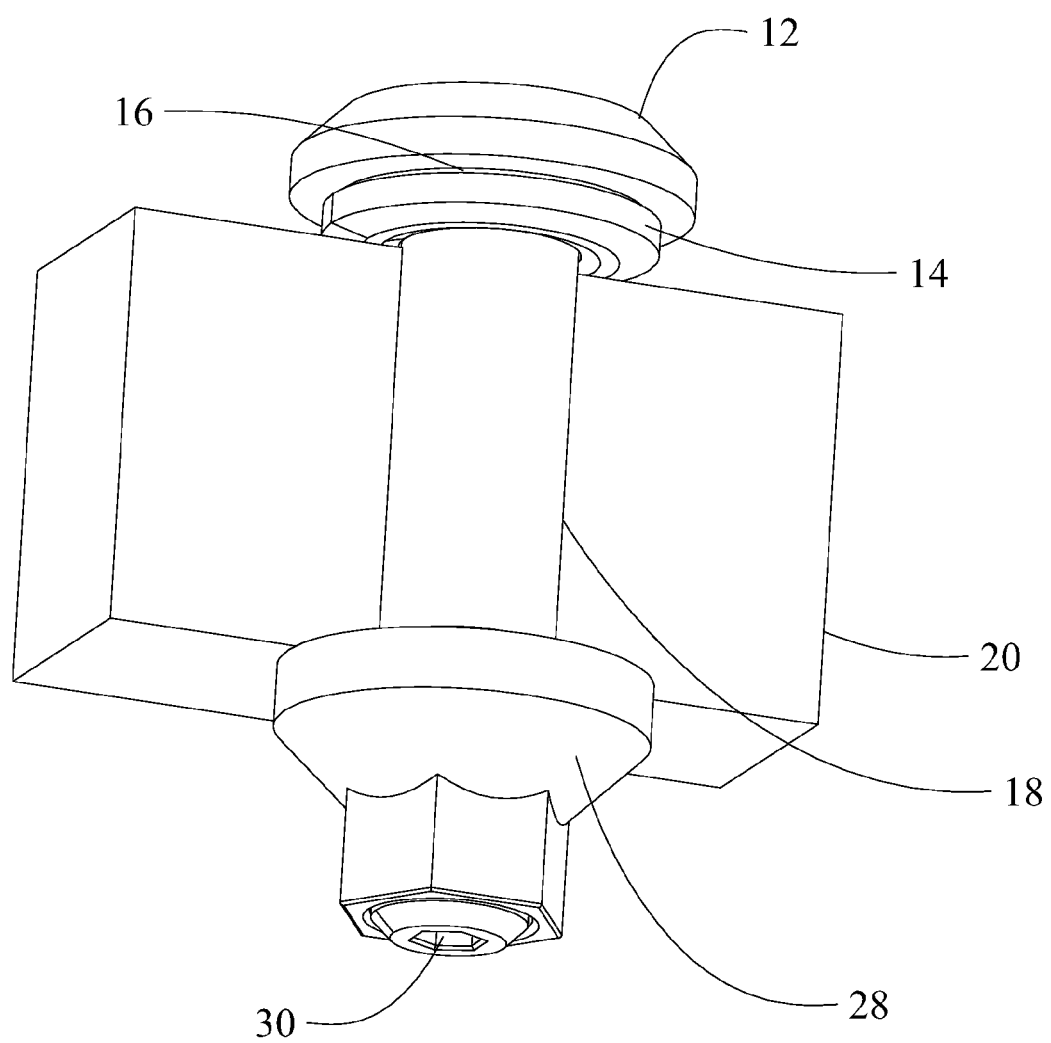
FIG. 3B is a lower isometric view of the fastener system showing the fastener, washer and nut employed in various embodiments disclosed herein.
Figure 3C:
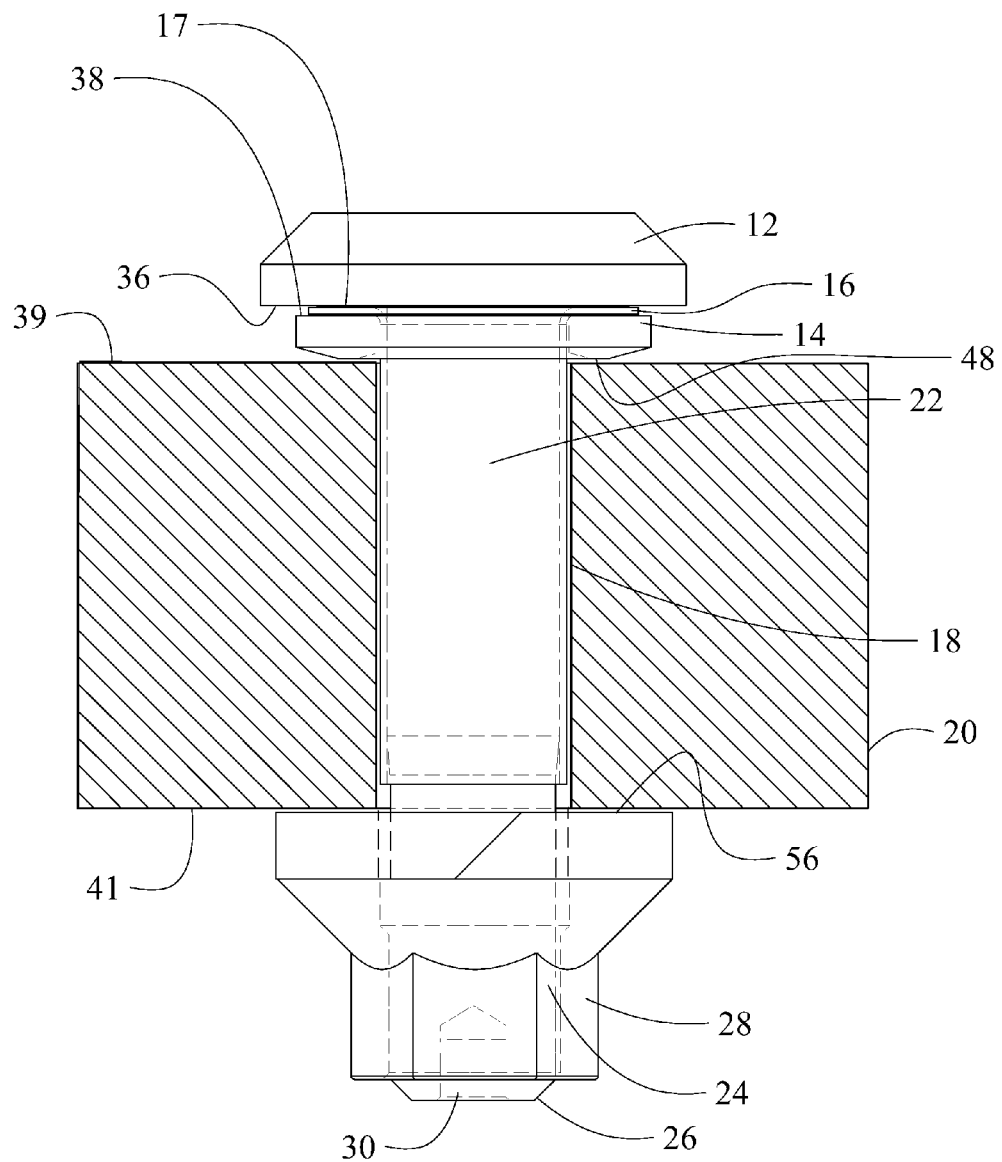
FIG. 3C is a side view of the fastener system showing the fastener, washer and nut employed in various embodiments disclosed herein as inserted in a structure (shown in section view) with a fastener hole.
Figure 3D:
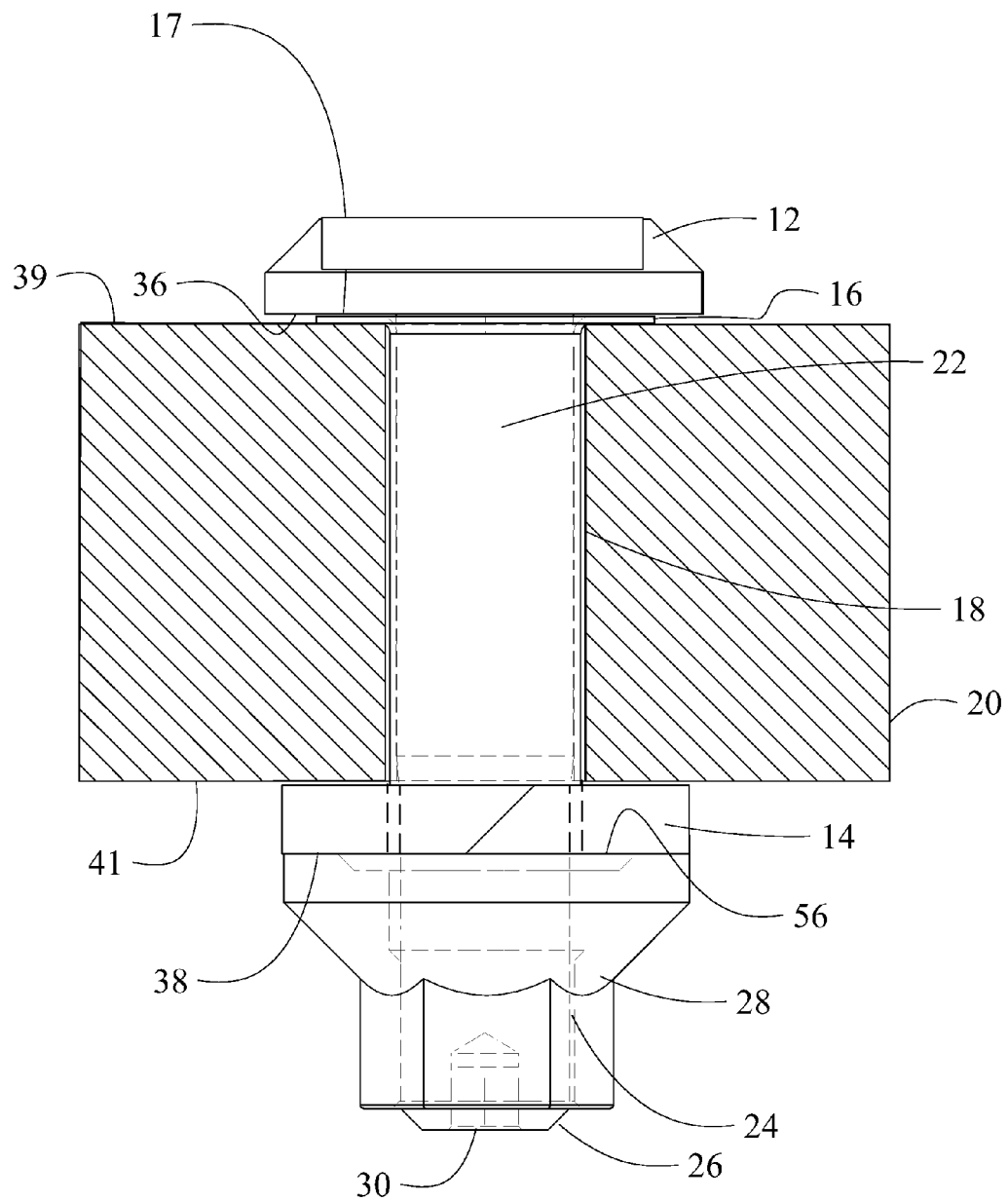
FIG. 3D is a side view of the fastener system showing the fastener and nut with the washer located under the nut as employed in various embodiments disclosed herein as inserted in a structure (shown in section view) with a fastener hole.

The embodiments described herein provide a fastener system providing EME protection available for use in assembly requirements in the methods or systems of an aircraft as defined in FIGS. 1 and 2 and described above or any similar structural assembly. While described for the embodiments herein for one type of threaded fastener, the features employed may be used on sleeved hex-drives (drive element in the shank), sleeved bolts (with either the head shape as the drive element, or a drive element in the head), or sleeved lockbolts (swaged) as examples As shown in FIGS. 3A-3D, the fastener system 10 incorporates a fastener 12 which may be used alone or received in a washer 14. A sleeve 16, inserted in an assembly hole 18 in the structure 20 in which the fastener system will be employed (as seen in FIG. 3C wherein elements are slightly spaced for clarity but are in direct contact in application), receives a shank 22 of the fastener 12 with threads 24 on a first end 26 of the fastener received in a internally threaded fastener element such as a nut 28 or frangible collar. The sleeve 16 may be positioned under the fastener or the washer 14, if employed, depending on the configuration. A multi-faceted or multi-lobed wrenchable counter-bore 30 such as a hex head counter-bore in the shank (best seen in FIG. 3B) is employed as a wrenching receptacle for torqueing the fastener system. The washer 14 may alternatively be placed under the nut 28 in various example embodiments as shown in FIG. 3D. Each element of the fastener system 10, fastener 12, washer 14 and nut 28, have engagement surfaces 36, 48 and 56 (all shown in FIGS. 3C and 3D) which interface with mating surfaces of adjoining elements or structure such as upper surface 38 on the washer, surfaces 39 or 41 on the structure 20, or surface 17 on the sleeve 16 (all seen in FIGS. 3C and 3D). Modification of these engagement surfaces as described for the following embodiments, enhances EME protection by creating a pressure contained system to prevent HPE (high energy sparks) and edge sparking during lightning conditions.

Figure 4:
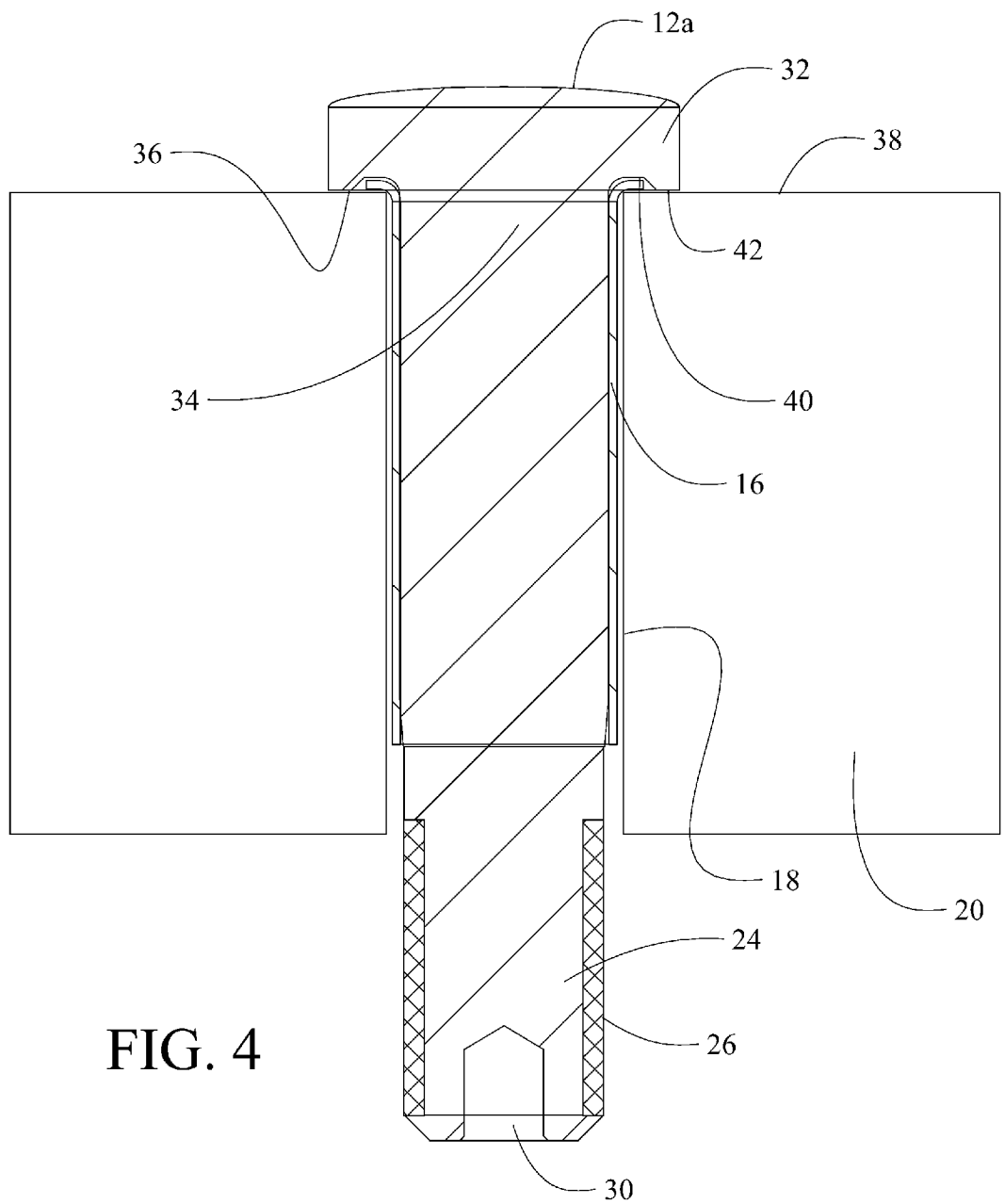
FIG. 4 is a side section view of a first embodiment of a fastener employing a reduced profile engagement surface for EME protection.

As a first EME protection enhancement, the fastener elements may each employ profiling of the engagement surfaces for reduced contact area. A first example using the fastener is shown in detail in FIG. 4 for a first embodiment identified as 12a. Head 32 extends from a second end 34 of the fastener 12a opposite threaded end 26. An engaging surface 36 on the head is interfaced to a mating surface either on the washer (to be described in greater detail with respect to FIG. 6), surface 38, or on the structure 20, surface 39, surrounding the assembly hole 18 or on surface 17 on sleeve 16. The engaging surface 36 is profiled to provide a reduced contact surface area. In the embodiment of FIG. 4, in inner radial portion 40 is relieved such that no contact is present with the mating surface and an outer radial portion 42 provides a contact surface engaging the mating surface, shown for example as surface 39 on the structure 20. Area of the contact surface of the outer radial portion 42 is about 20% to 30% of the total surface area. For exemplary embodiments, the fastener is fabricated from 6AL-4V Titanium alloy and coated with a dielectric or electrically insulative coating. In an exemplary embodiment the coating is a bonded epoxy resin coating. In exemplary embodiments where enhanced contact between the fastener head and sleeve is obtained the coating may be removed from the engaging surface portion for further improving the EME protection.

Figure 5:
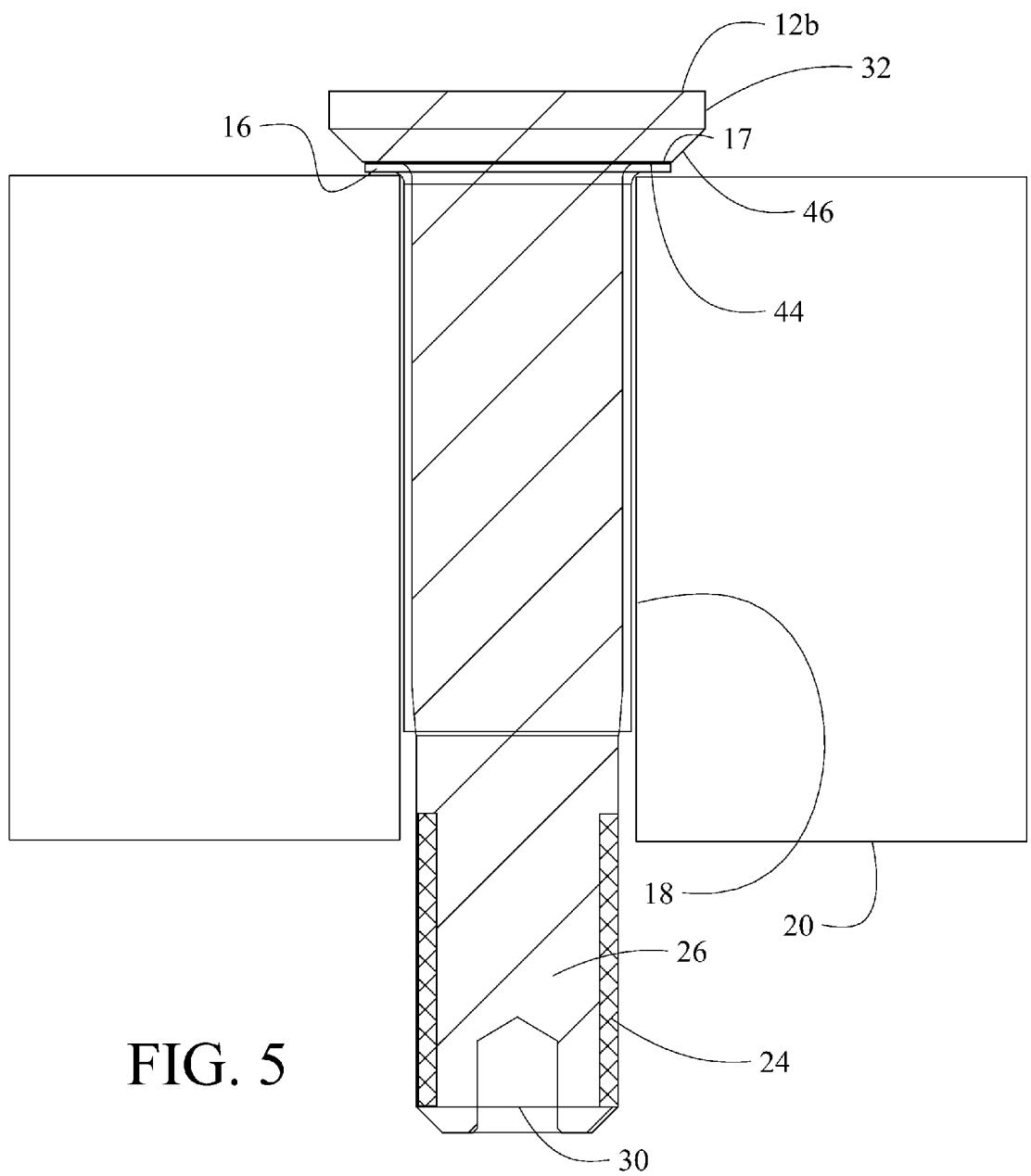
FIG. 5 is a side section view of a second embodiment of a fastener for EME employing an alternative reduced profile engagement surface protection.

An alternative embodiment of the fastener, designated 12b, is shown in FIG. 5. As in the embodiment of FIG. 4, the engaging surface 36 is profiled to reduce the contact area. However, for the embodiment of FIG. 5, an inner radial portion 44 provides a contact surface for engaging the mating surface, in this example mating surface 17 on the sleeve 16. An outer radial portion 46 is relieved, as an angled chamfer in the example shown, for no contact with the engaging surface. Area of the contact surface of the inner radial portion 44 is about 20% to 30% of the total surface area. For exemplary embodiments, the fastener is fabricated from 6AL-4V Titanium alloy and coated with a dielectric or electrically insulative coating. The coating may be removed from the engaging surface on the fastener head to improve the conductive path to the sleeve, or if a washer is used on the head-side it could be removed from the mating surface of the washer to improve the conductive path to the sleeve. For both embodiments shown in FIGS. 4 and 5 in exemplary implementations, the reduced contact area enhances EME protection.

Figure 6:
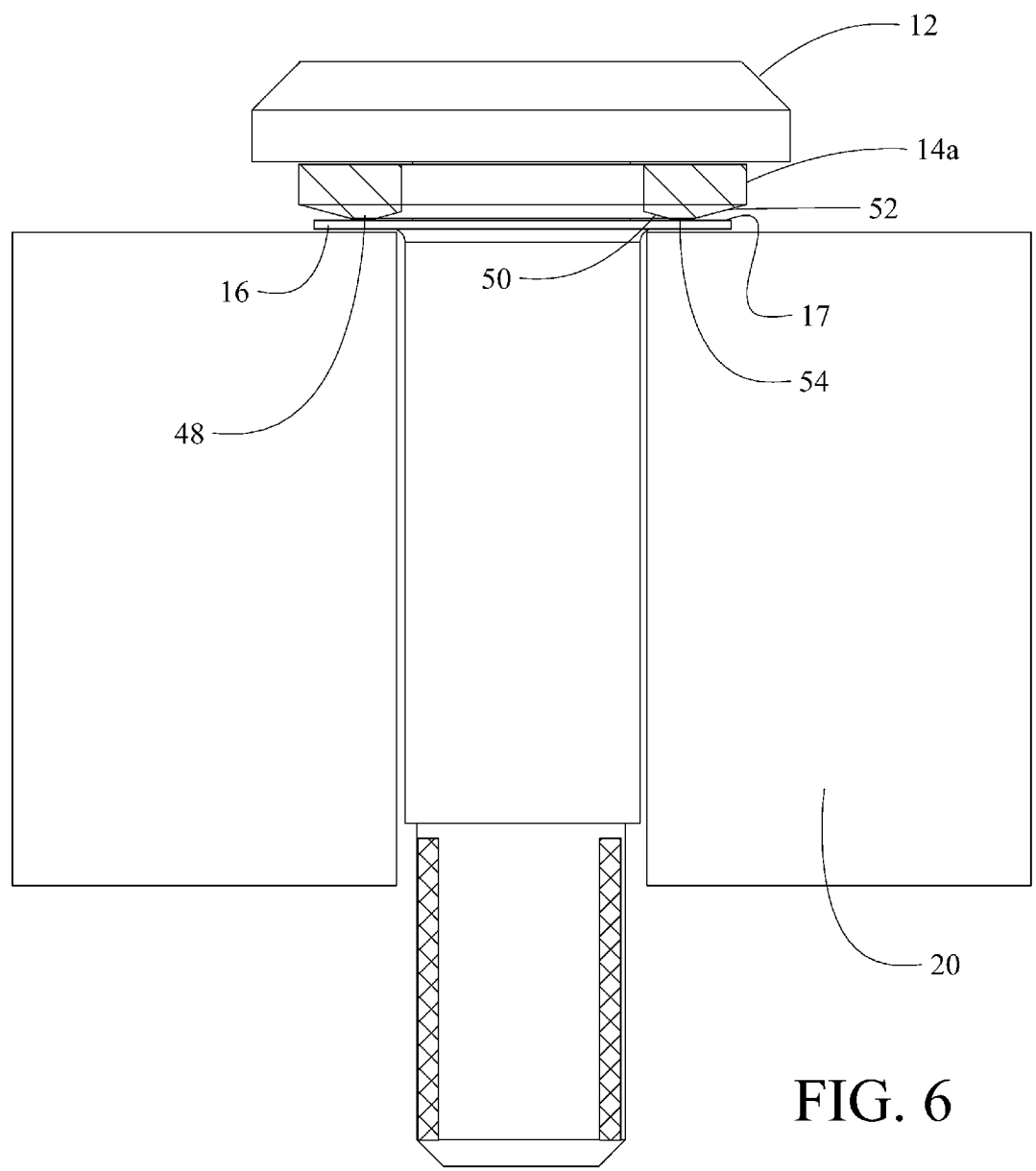
FIG. 6 is a side section view of an embodiment of a washer employing a reduced profile engagement surface for EME protection.

As an alternative or additional implementation, the washer, shown as 14a in FIG. 6, may be configured with a profiled engagement surface 48. As described above for the fastener embodiments, washer 14a has the engagement surface 48 profiled for reduced contact area with the mating surface 39 of structure 20. As yet an additional profile type, the engagement surface 48 has relieved inner radial portion 50 and a relieved outer radial portion 52, both shown as chamfers for the embodiment of FIG. 6, with contact limited to a central radial portion 54 which provides a contact surface for engaging the mating surface 39. Area of the contact surface of the central radial portion 54 is about 20% to 30% of the total surface area. For exemplary embodiments, the washer is fabricated from 6AL-4V Titanium alloy or A286 CRES and coated with a dielectric or electrically insulative coating. As previously discussed, the coating could be removed from the engaging surface of the fastener head to improve the conductive path to the sleeve, or if a washer is used on the head-side the coating could be removed from the mating surface of the washer to improve the conductive path to the sleeve. For the embodiment shown in FIG. 6, alone or in combination with a profiled contact surface on the fastener, in exemplary implementations, the reduced contact area enhances EME protection.

Figure 7:
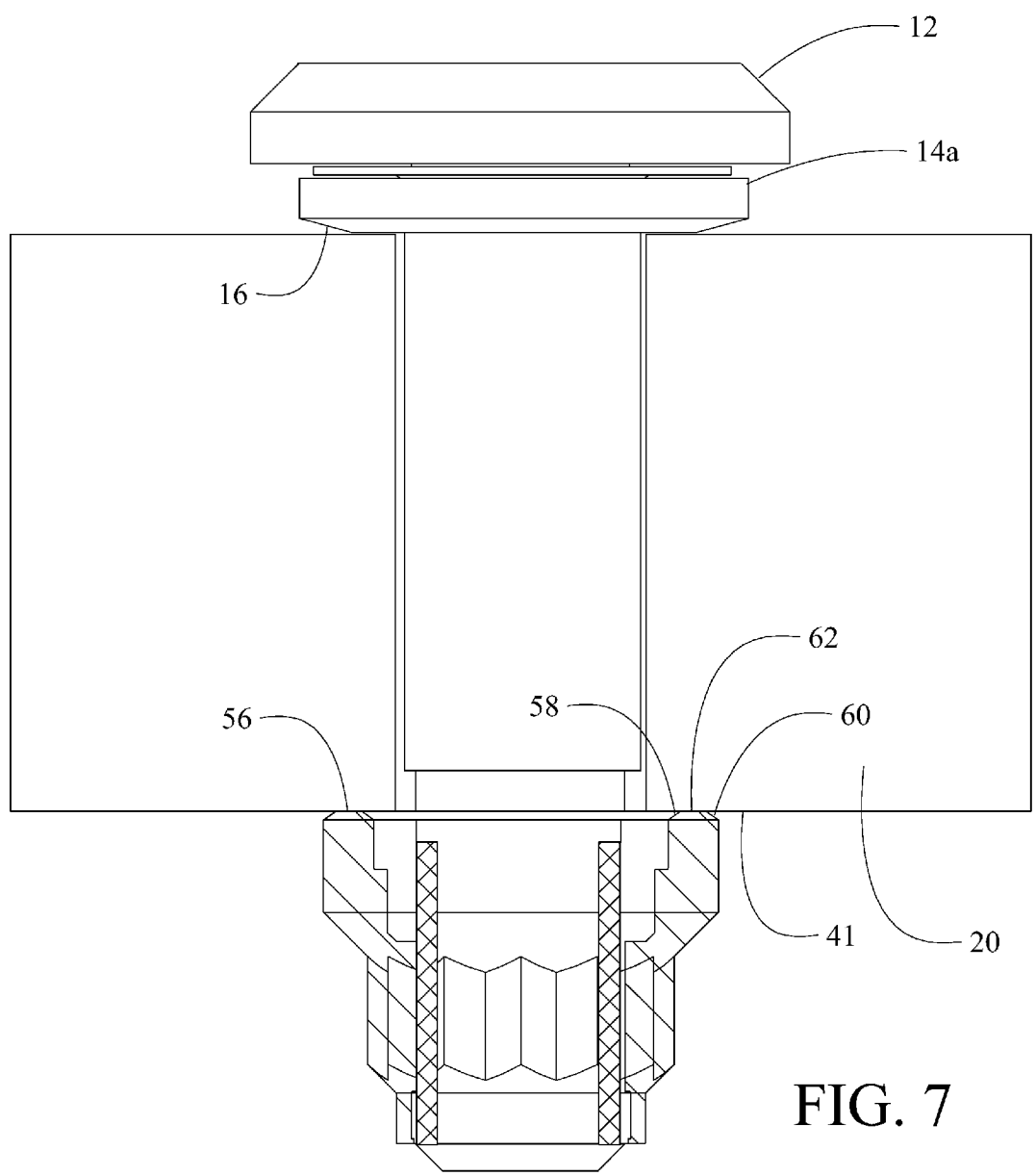
FIG. 7 is a side section view of an embodiment of a nut employing a reduced profile engagement surface for EME protection.

The nut, shown as 28a in FIG. 7, provides yet another alternative or additional implementation for configuration of a profiled engagement surface 56. The engagement surface 56 has relieved inner radial portion 58 and a relieved outer radial portion 60, both shown as chamfers for the embodiment of FIG. 7 with contact limited to a central radial portion 62 which provides a contact surface for engaging the mating surface 41. Area of the contact surface of the central radial portion 62 is about 20% to 30% of the total surface area. For exemplary embodiments, the nut is fabricated from 6AL-4V Titanium alloy or A286 CRES and coated with a dielectric or electrically insulative coating. The coating could be removed from the engagement surface of the fastener head to improve the conductive path to the mating surface of the sleeve, or if a washer is used on the head-side the coating could be removed from the mating surface of the washer to improve the conductive path to the sleeve, or if a washer is used on the nut-side, the coating could be removed from the mating surface of the washer to improve the conductive path to the nut. For the embodiment shown in FIG. 7, alone or in combination with a profiled contact surfaces on the fastener and/or washer, in exemplary implementations, the reduced contact area enhances EME protection. As previously shown and described with respect to FIG. 3D, a washer 14 may be alternatively employed under the nut 28.

Figure 8:
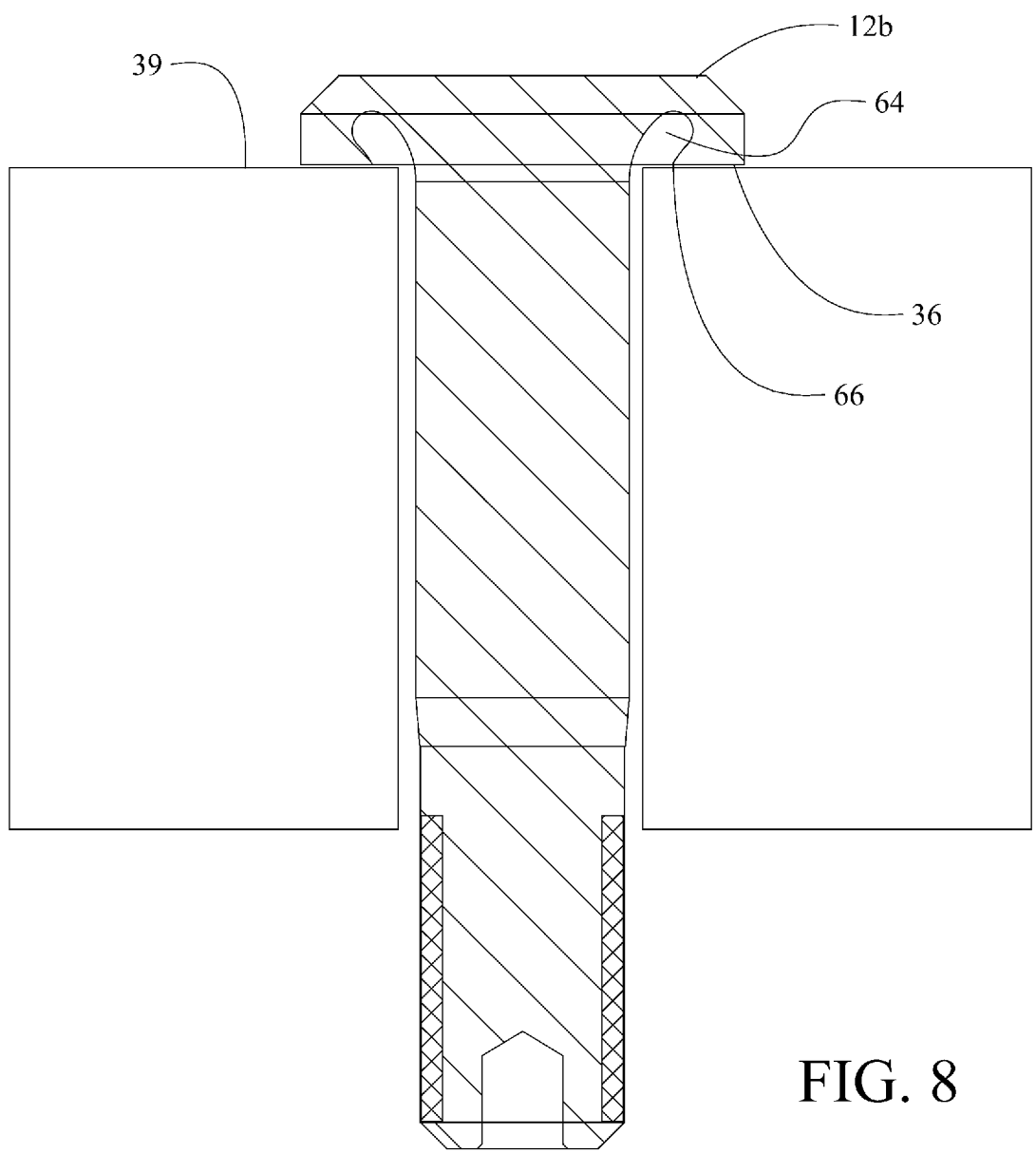
FIG. 8 is a side section view of an embodiment of a fastener using an endothermic concentric chamber for EME protection.

In addition or as an alternative to the reduced contact area as a second EME protection enhancement, the fastener elements may each employ endothermic concentric chambers extending from the engagement surface. As shown in FIG. 8 for a fastener 12b, an endothermic concentric chamber 64 may be introduced in the engagement surface 36. The endothermic concentric chamber 64 provides an expansion volume to contain or entrap HPE. For the embodiment shown in FIG. 8, a rounded concentric shape is employed with a vertex 66 oriented radially inward at a radially outward junction of the endothermic concentric chamber 64 and the engagement surface 36. In exemplary embodiments, for predetermined total volume of the head of fastener 12b, the volume of the endothermic concentric chamber 64 will be $1/8$ to $1/3$ of that total volume. The chamber as a relief extending from the engagement surface 36 additionally provides a reduced contact area, portion 37, for the engagement surface shown engaging mating surface 39 of structure 20 in this example, yielding comparable benefits to the reduced contact area embodiment described with respect to FIG. 4.

Figure 9:
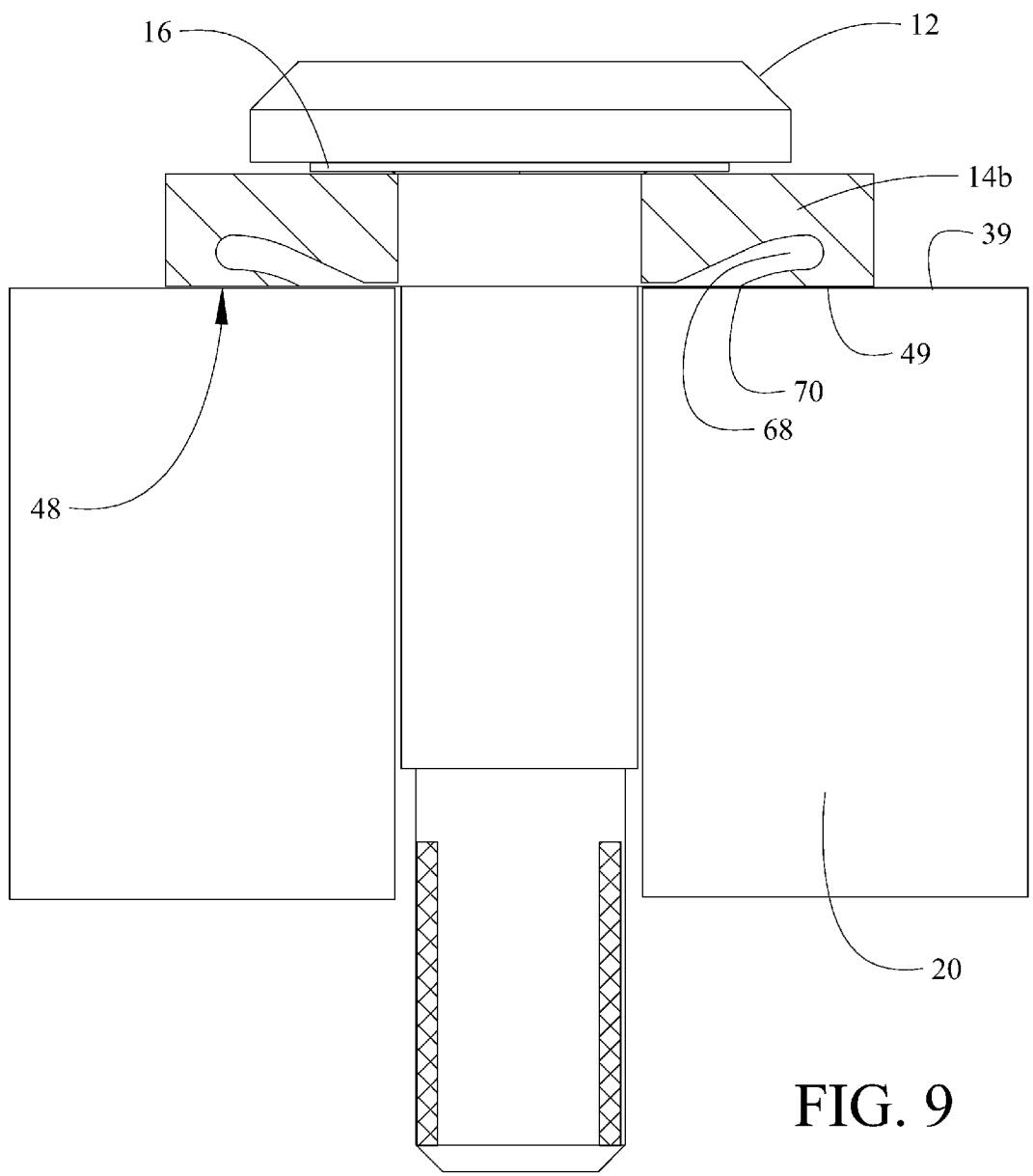
FIG. 9 is a side section view of an embodiment of a washer using an endothermic concentric chamber for EME protection.

A washer 14b shown in FIG. 9 may also employ an endothermic concentric chamber 68 in the engagement surface 48. For the embodiment shown in FIG. 9, a rounded concentric shape is employed with a vertex 70 oriented radially inward at a radially outward junction of the endothermic concentric chamber 68 and the engagement surface 48 in a configuration similar to that described for the fastener 12b in FIG. 8. In exemplary embodiments, for predetermined total volume of the washer 14b, the volume of the endothermic concentric chamber 68 will be $1/8$ to $1/3$ of that total volume. The chamber as a relief extending from the engagement surface 48 again provides a reduced contact area, portion 49, for the engagement surface shown engaging mating surface 39 on the structure 20, in this example, yielding comparable benefits to the reduced contact area embodiment described with respect to FIG. 4.

Figure 10:
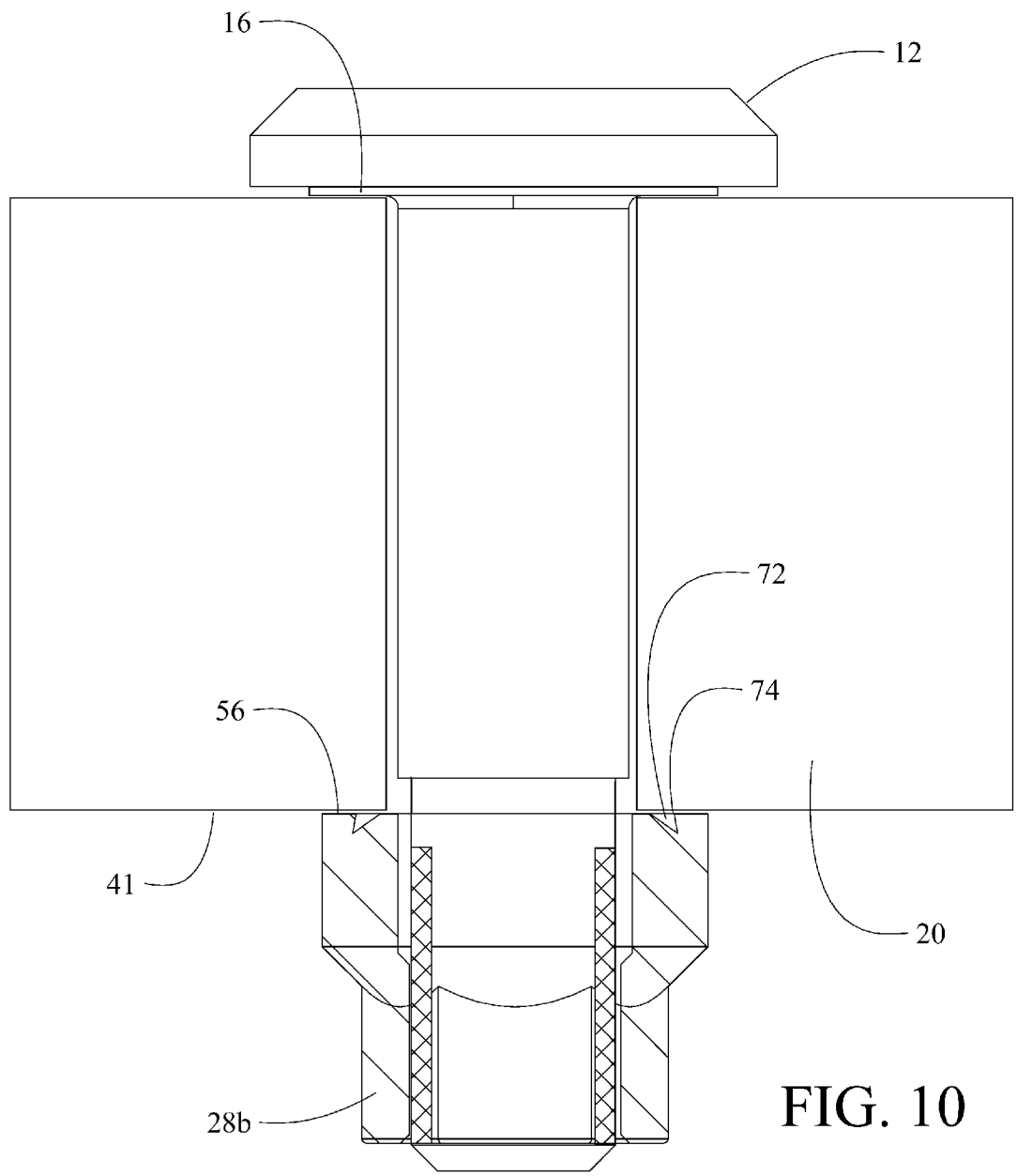
FIG. 10 is a side section view of an embodiment of a nut using an endothermic concentric chamber or EME protection.

A nut 28b shown in FIG. 10 may also employ an endothermic concentric chamber 72 in the engagement surface 56. For the embodiment shown in FIG. 10, an alternative triangular section concentric shape is employed with a vertex 74 oriented radially inward at a radially outward junction of the endothermic concentric chamber 72 and the engagement surface 56 in a configuration similar to that described for the fastener 12b in FIG. 8. In exemplary embodiments, for predetermined total volume of the nut, the volume of the endothermic concentric chamber 72 will be $1/8$ to $1/4$ of that total volume. The chamber as a relief extending from the engagement surface 56 additionally provides a reduced contact area for the engagement surface yielding comparable benefits to the reduced contact area embodiment described with respect to FIG. 6.

Figure 11:
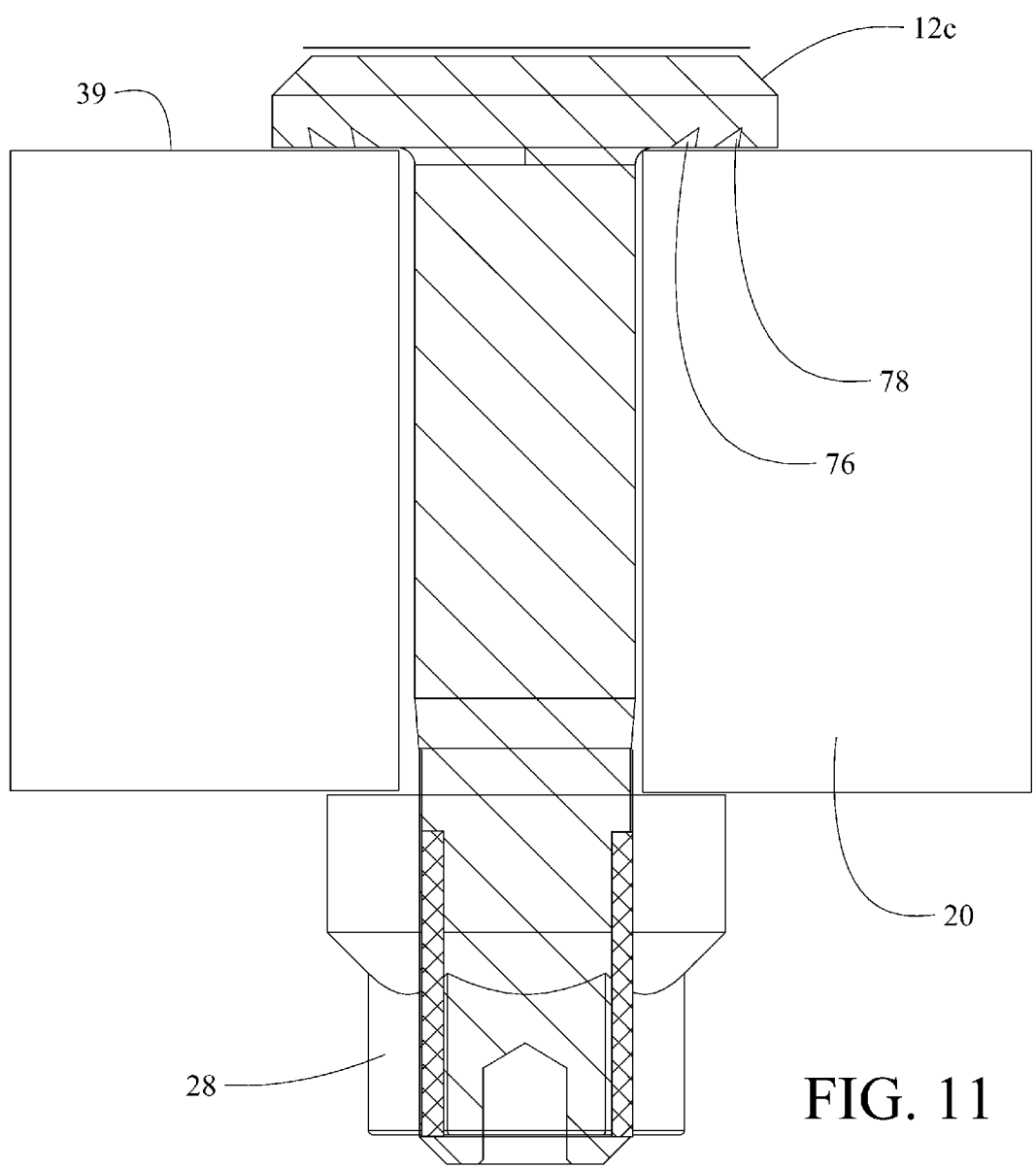
FIG. 11 is a side section view of an embodiment of a fastener using multiple endothermic concentric chambers for EME protection.

Multiple endothermic concentric chambers may also be employed in the engagement surfaces of the fastener system elements. As shown in FIG. 11, a fastener 12c incorporates a first inner endothermic concentric chamber 76 and an outer endothermic concentric chamber 78. Each chamber provides a volume with a vertex, 80 and 82 respectively, oriented radially inward at a radially outward junction of the endothermic concentric chamber an, as an example, the engagement surface 39 of the structure 20. In exemplary embodiments, for predetermined total volume of the head of fastener 12c, each chamber 76 and 78 will be $1/16$ to $1/6$ of that total volume.

Figure 12:
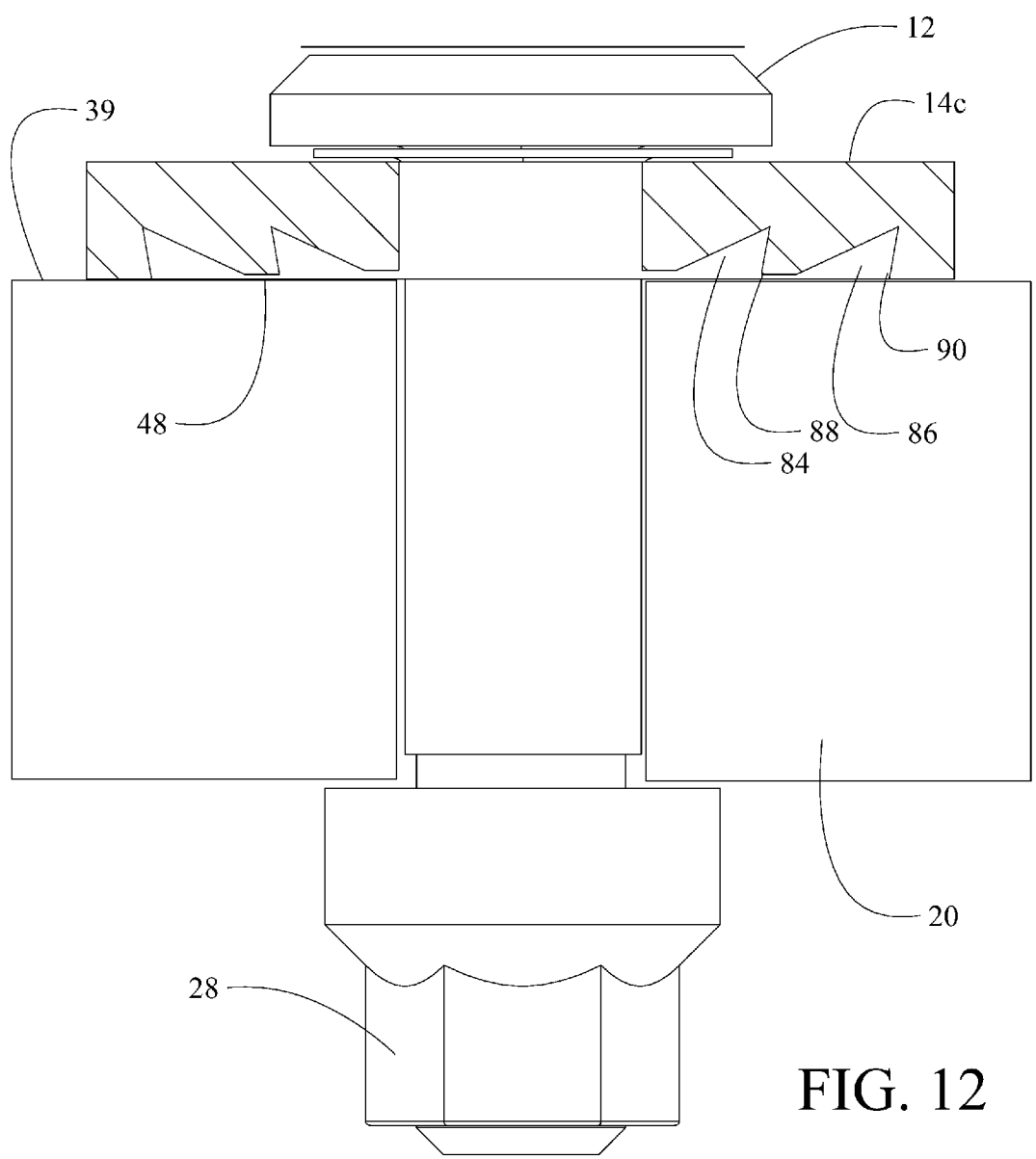
FIG. 12 is a side section view of an embodiment of a washer using multiple endothermic concentric chambers for EME protection.

Similarly, a washer 14c, as shown in FIG. 12, incorporates a first inner endothermic concentric chamber 84 and an outer endothermic concentric chamber 86 in the engagement surface 48. Each chamber provides a volume with a vertex, 88 and 90 respectively, oriented radially inward at a radially outward junction of the endothermic concentric chamber and the engagement surface 48. In exemplary embodiments, for predetermined total volume of washer 14c, the volume of each of the endothermic concentric chambers 84 and 86 will be 1/16 to 1/8 of that total volume.

Figure 13:
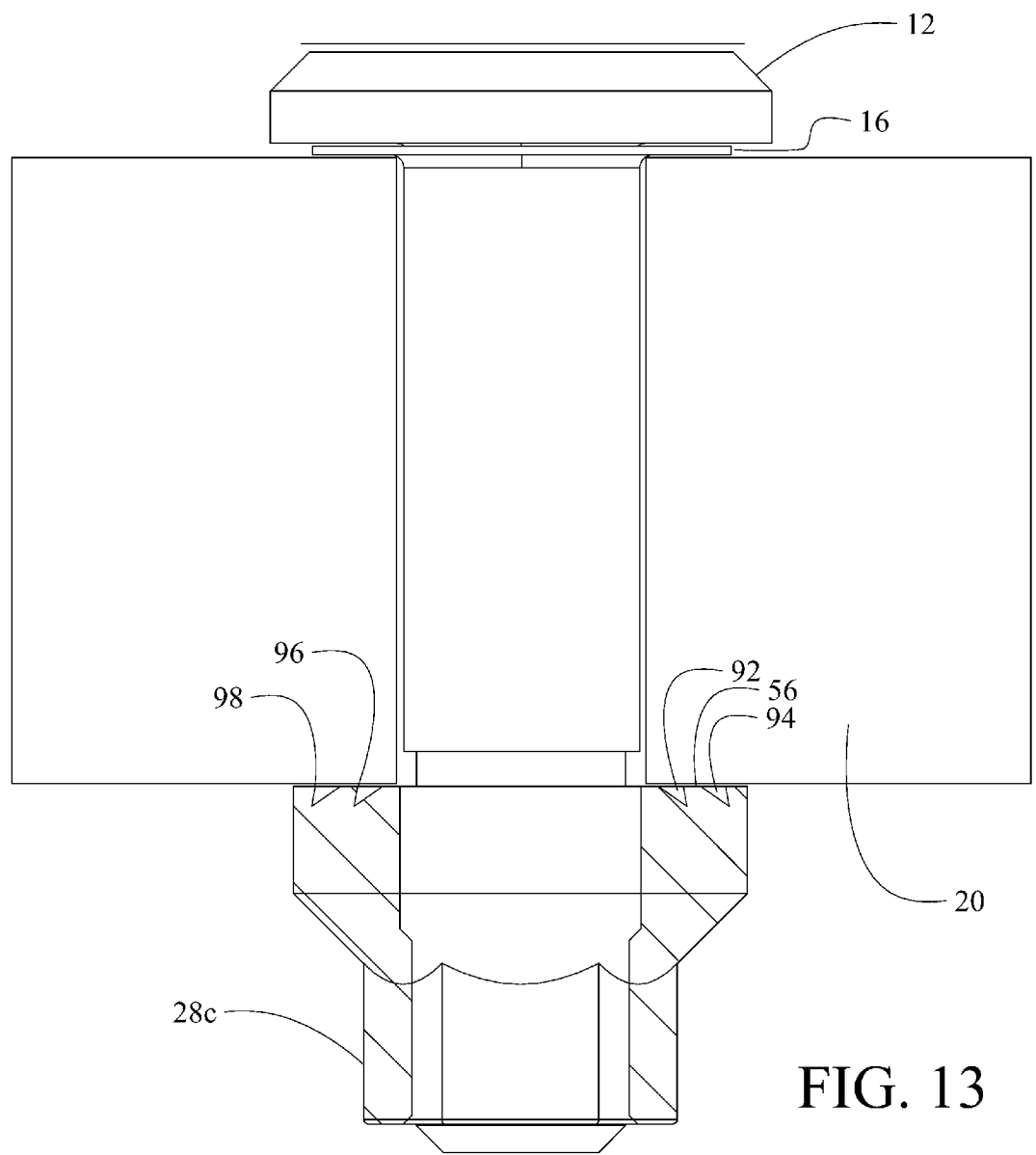
FIG. 13 is a side section view of an embodiment of a nut using multiple endothermic concentric chambers for EME protection.

Multiple endothermic concentric chambers may also be employed in a nut 28c as shown in FIG. 13. A first inner endothermic concentric chamber 92 and an outer endothermic concentric chamber 94 are introduced in the engagement surface 56. Each chamber provides a volume with a vertex, 96 and 98 respectively, oriented radially inward at a radially outward junction of the endothermic concentric chamber and the engagement surface 56. In exemplary embodiments, for predetermined total volume of nut 28c, the volume of each of the endothermic concentric chambers 92 and 94 will be 1/16 to 1/8 of that total volume.

Figure 14:
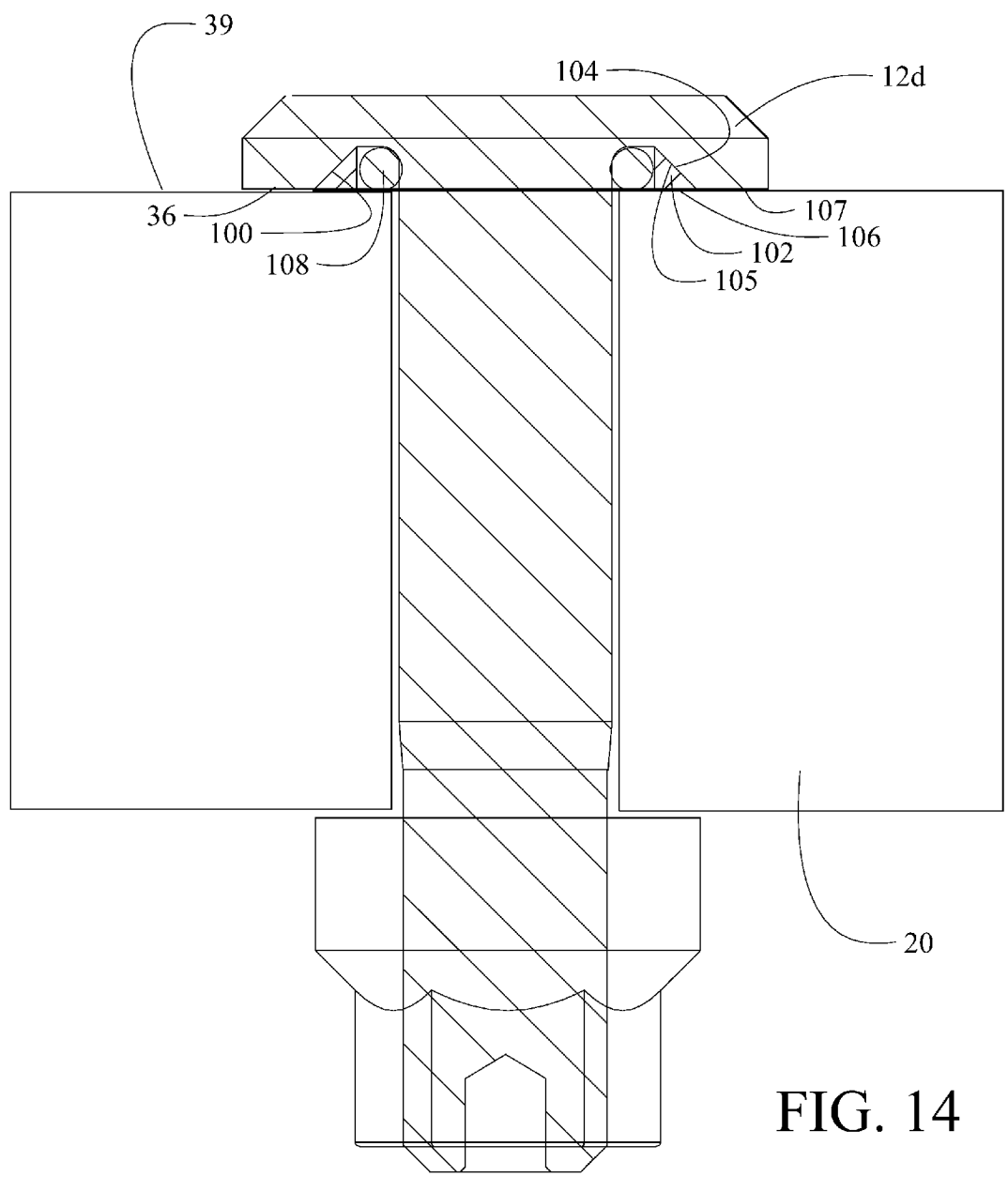
FIG. 14 is side section view of an embodiment of a fastener using a double wedge seal ring for EME protection.

As an alternative enhancement to EME protection, one or more of the elements of the fastener system may employ a double wedge seal ring incorporated in the engagement surface. For a fastener 12d as shown in FIG. 14, a wedge relief 100 in the engagement surface 36 is sized to receive a wedge ring 102. The wedge relief 100 has a radially inward and downward oriented angled surface 104 which engages a radially outward and upward angled surface 105 on the wedge ring 102. Thickness 104 of the wedge ring exceeds the depth of wedge relief 100 sufficiently for head 32 to urge the wedge ring into contact with the adjacent mating surface, surface 39 on structure 20 shown in FIG. 14. Outboard portion 107 of the engagement surface 36 is thereby spaced from the mating surface providing a reduced contact area provided by a bottom surface 106 of the wedge ring 102. An seal ring 108 is employed radially inward from the wedge ring 102 and, upon compression of the fastener head 32 as well as expanded gas pressure, radially engages the shank 22 and an inward radial surface 110 of the wedge ring 102 to urge the wedge ring radially outward enhancing the engagement of the angled surface 104 and angled surface 105. For example embodiments, the wedge ring is fabricated from a soft metal such as copper, brass oraluminum alloy. The seal ring may be a deformable metallic ring, resilient rubber or elastomeric material such as a synthetic rubber such as flurosilicone rubber or neoprene.

Figure 15:
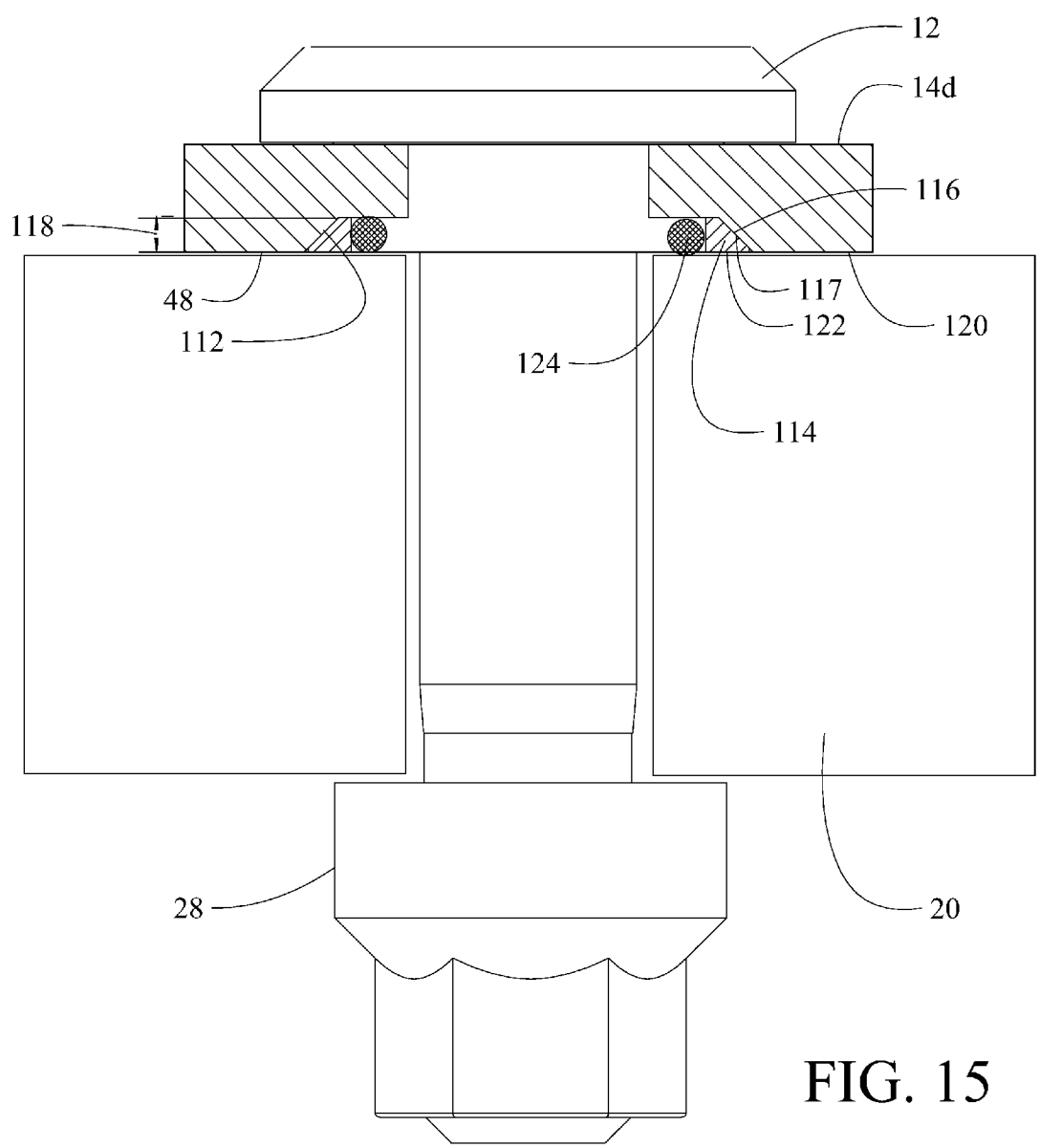
FIG. 15 is a side section view of an embodiment of a washer using a double wedge seal ring for EME protection.

In a similar configuration, a washer 14d as shown in FIG. 15, employs a wedge relief 112 in the engagement surface 48 sized to receive a wedge ring 114. The wedge relief 112 has a radially inward and downward oriented angled surface 116 which engages a radially outward and upward angled surface 117 on the wedge ring 114. Thickness 118 of the wedge ring exceeds the depth of wedge relief 112 sufficiently for the washer to urge the wedge ring into contact with the adjacent mating surface, surface 39 on structure 20 for the embodiment shown in FIG. 15. Outboard portion 120 of the engagement surface 48 is thereby spaced from the mating surface providing a reduced contact area provided by a bottom surface 122 of the wedge ring 114. A seal ring 124 is employed radially inward from the wedge ring 114 and, upon compression of the washer 14d as well as expanded gas pressure, radially engages an inward radial surface 126 of the wedge ring 114 to urge the wedge ring radially outward enhancing the engagement of the angled surface 116 and angled surface 117. For example embodiments, the wedge ring is fabricated from a soft metal such as copper, brass, aluminum alloy. The seal ring may be a deformable metallic ring, resilient rubber or elastomeric material such as a synthetic rubber such as flurosilicone rubber or neoprene.

Figure 16:
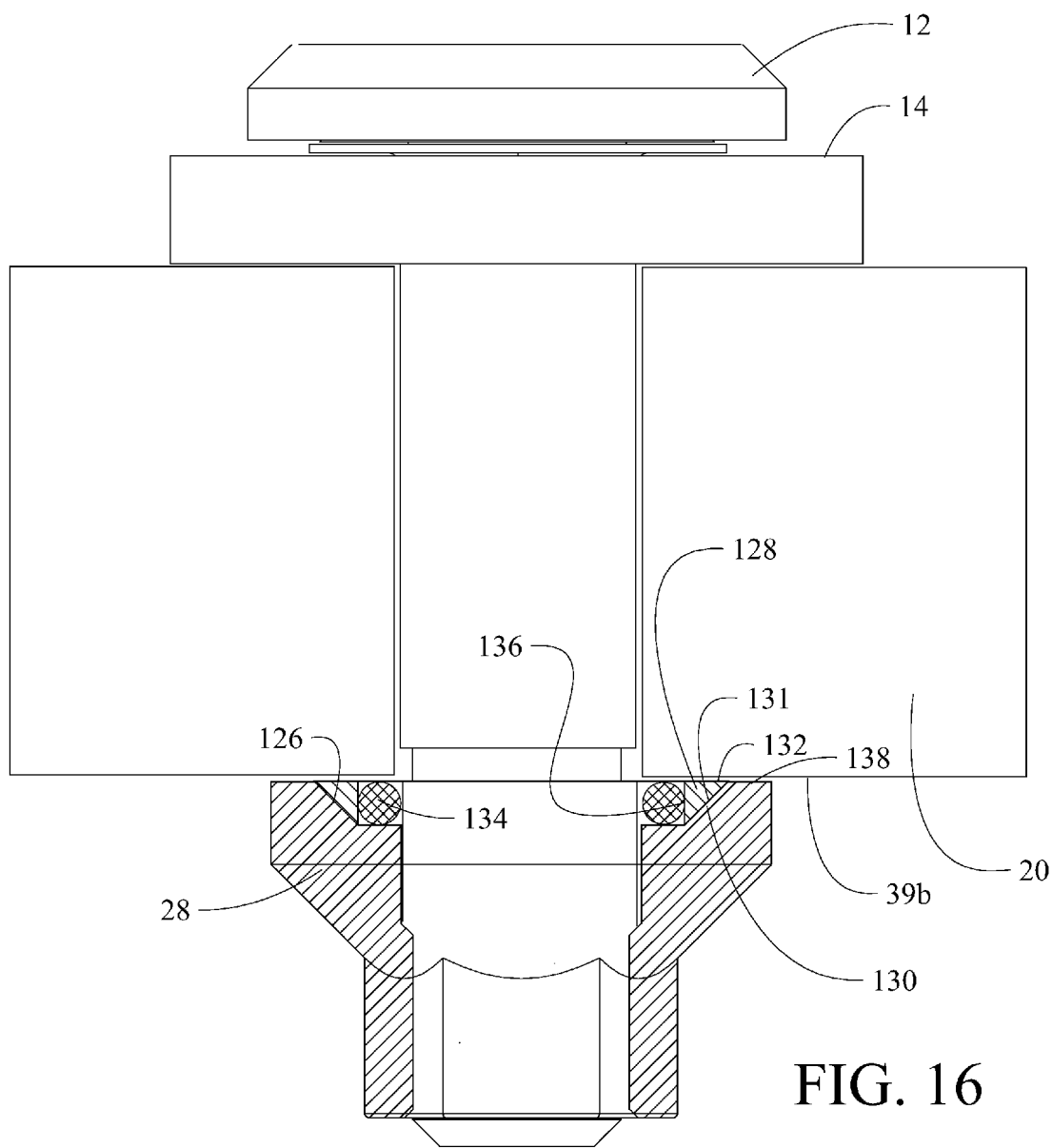
FIG. 16 is a side section view of an embodiment of a nut using a double wedge seal ring for EME protection.

Finally, a nut 28d as shown in FIG. 16 may be configured to employ a wedge relief 126 in the engagement surface 56 sized to receive a wedge ring 128. The wedge relief 126 has a radially inward and upward oriented angled surface 130 which engages a radially outward and downward angled surface 131 on the wedge ring 128. Thickness of the wedge ring 128 exceeds the depth of wedge relief 126 sufficiently for the washer to urge the wedge ring into contact with the adjacent mating surface, surface 39b on structure 20 for the embodiment shown in FIG. 16. Outboard portion 138 of the engagement surface 56 is thereby spaced from the mating surface providing a reduced contact area provided by a bottom surface 132 of the wedge ring 128. A seal ring 134 is employed radially inward from the wedge ring 128 and, upon compression of the nut 28d as well as expanded gas pressure, radially engages an inward radial surface 136 of the wedge ring 128 to urge the wedge ring radially outward enhancing the engagement of the angled surface 130 and angled surface 131. For example embodiments, the wedge ring is fabricated from a soft metal such as copper, brass, aluminum alloy. The seal ring may be a deformable metallic ring, resilient rubber or elastomeric material such as a synthetic rubber such as flurosilicone rubber or neoprene.

Figure 17:
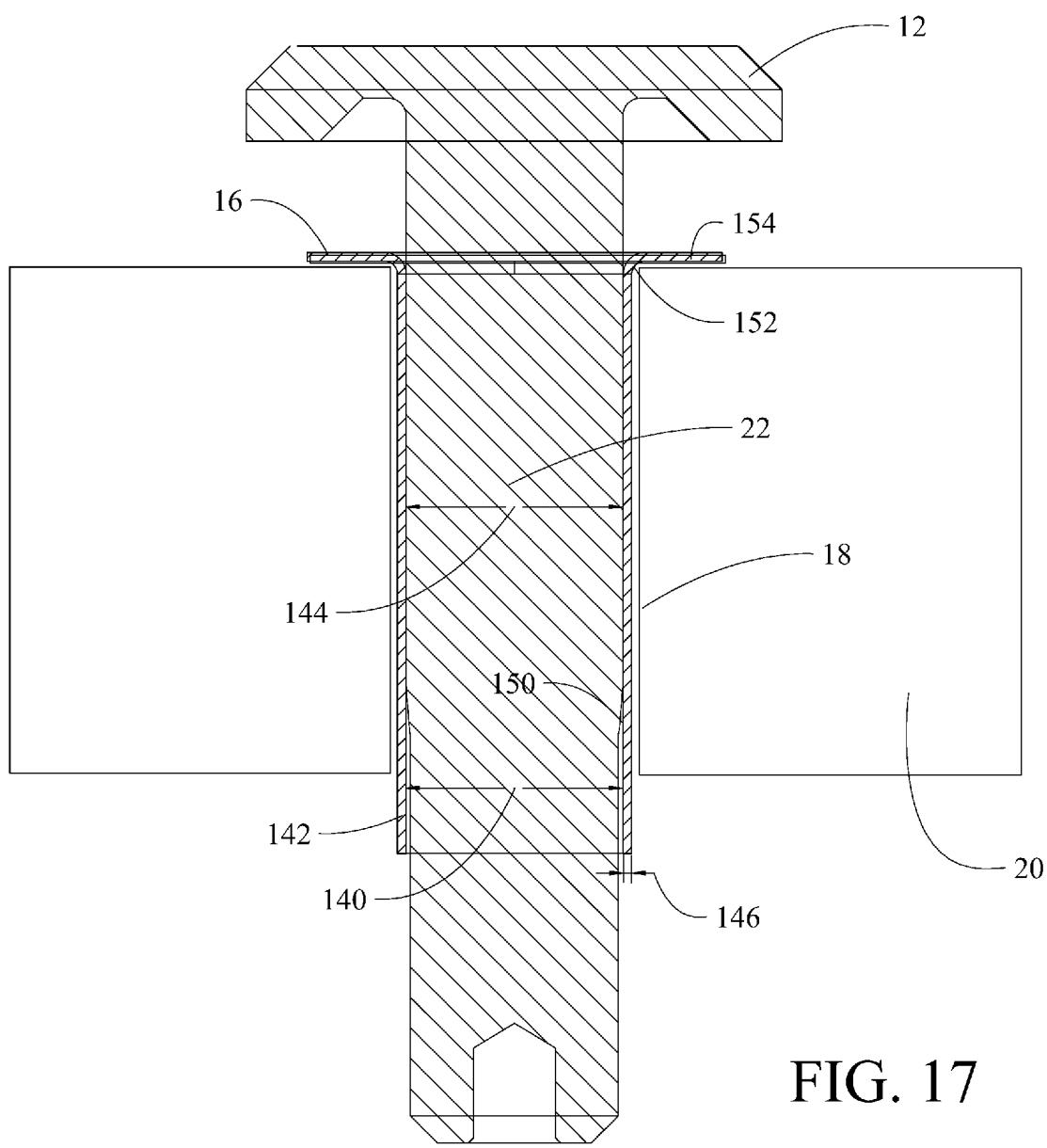
FIG. 17 is a side section view showing details of the sleeve and fastener.

For most of the embodiments shown, the sleeve 16, mates with the shank 22 of the fastener and allows for installation into interference fit holes in a composite structure as shown in detail in FIG. 17. An inner diameter (ID) 140 of a body 142 of the sleeve is smaller than the diameter 144 of the fastener shank 22. The combined ID 140 and thickness 146 of the body 142 allows the sleeve 16 to be installed into the composite without damage. The surface of ID 140 of the sleeve is lubricated and allows the fastener 12 to make the sleeve 16 radially expand when the fastener shank 22 slides into the sleeve body 142 preventing damage to the composite while increasing the contact area between fastener shank and sleeve as well as the sleeve 16 and assembly hole 18 in the structure. A taper 150 or radius lead-in geometry on the fastener shank 22 and a fillet 152 between a flange 154 and body 142 on the sleeve are employed to enhance insertion alignment of the fastener 12 into the sleeve 16 and expansion of the sleeve. Increased contact area improves the electrical path with mating structure and minimized resistance loss that can lead to ionization and heating of air and subsequent potential HPE. Flange 154 provides a conducting mating surface for the engagement surface 36 of the fastener 12 as described above for the embodiment of FIG. 5 or engagement surface 48 of the washer 14, if used. Absence of the dielectric coating engagement surfaces of the fastener or washer improves conductivity with the sleeve. The absence of coating improves the conductive path of the energy transferred from the sleeve to the fastener or washer and prevents any arcing at the edge of the fastener head and sleeve. Additionally the bottom portion of the sleeve is coated with a dielectric or insulative coating to prevent arcing between the sleeve and counter-bore of the mating internally threaded fastener such as the nut 28. For exemplary embodiments, the sleeve 16 is fabricated from A286 CRES. The surface of ID 140 of the sleeve body 142 may be coated with a dry film lubricant.

Figure 18:
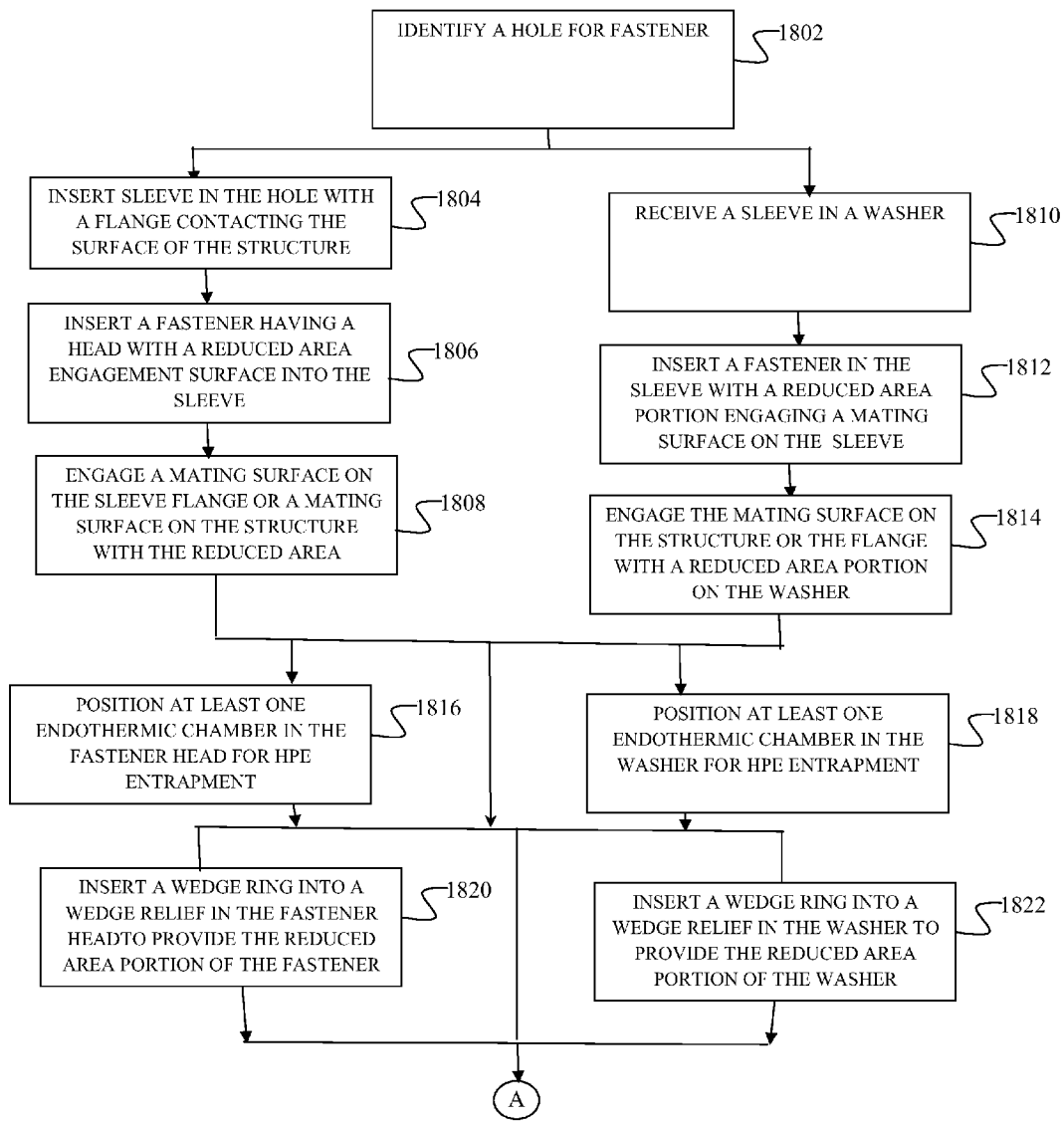
FIG. 18 is a flow chart of a method for EME protection with a fastener system; and, FIG. 19 is a flow chart of a method for fabrication of a fastener system with EME protection.
Figure 18:
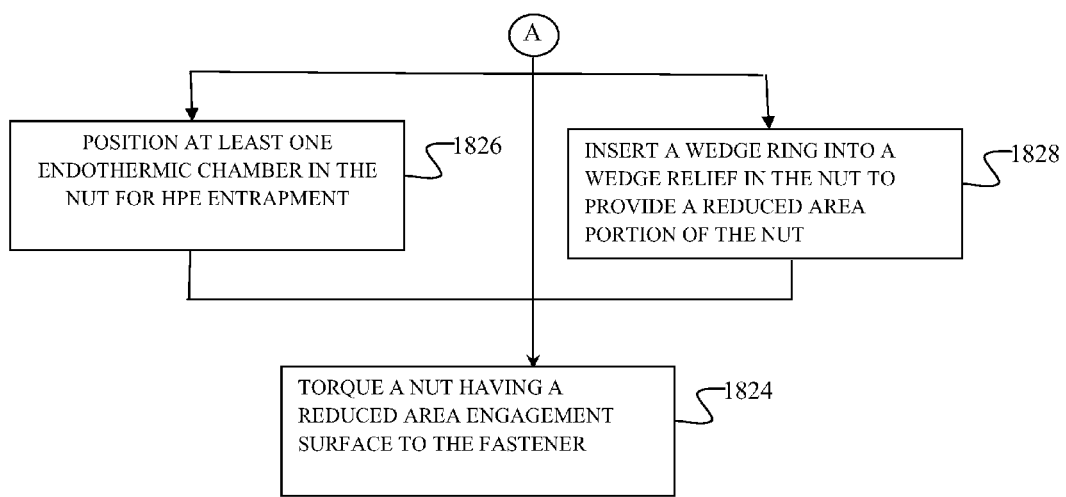

The embodiments disclosed herein are employed for fastener EME protection in a method as described in FIG. 18. A hole in a composite structure is identified for insertion of a fastener, step 1802. A body of a sleeve is inserted in the hole with a flange contacting the surface of the structure, step 1804. A fastener having a head with a reduced area engagement surface is inserted into the sleeve, step 1806, with the reduced area portion engaging a mating surface on the sleeve flange or a mating surface on the structure, step 1808. Alternatively, a washer may receive the sleeve, step 1810 insertion of the fastener in the sleeve and the reduced area portion engages a mating surface on the sleeve, step 1812. The washer may additionally engage the mating surface on the structure or the flange with a reduced area portion, step 1814. At least one endothermic chamber may be positioned in the fastener head for HPE entrapment, step 1816. Similarly, at least one endothermic chamber may be positioned in the washer for HPE entrapment, step 1818. A wedge ring may be inserted into a wedge relief in the fastener head, step 1820 to provide the reduced area portion of the fastener engagement surface. A wedge ring may alternatively be inserted into a wedge relief in the washer, step 1822, to provide the reduced area portion on the washer engagement surface. A nut having a reduced area engagement surface is torqued to the fastener, step 1824, with the reduced area portion engaging a mating surface on the structure. At least one endothermic chamber may be positioned in the nut for HPE entrapment, step 1826. A wedge ring may be inserted into a edge relief in the nut, step 1828, to provide the reduce area portion on the nut engagement surface.

Figure 19:
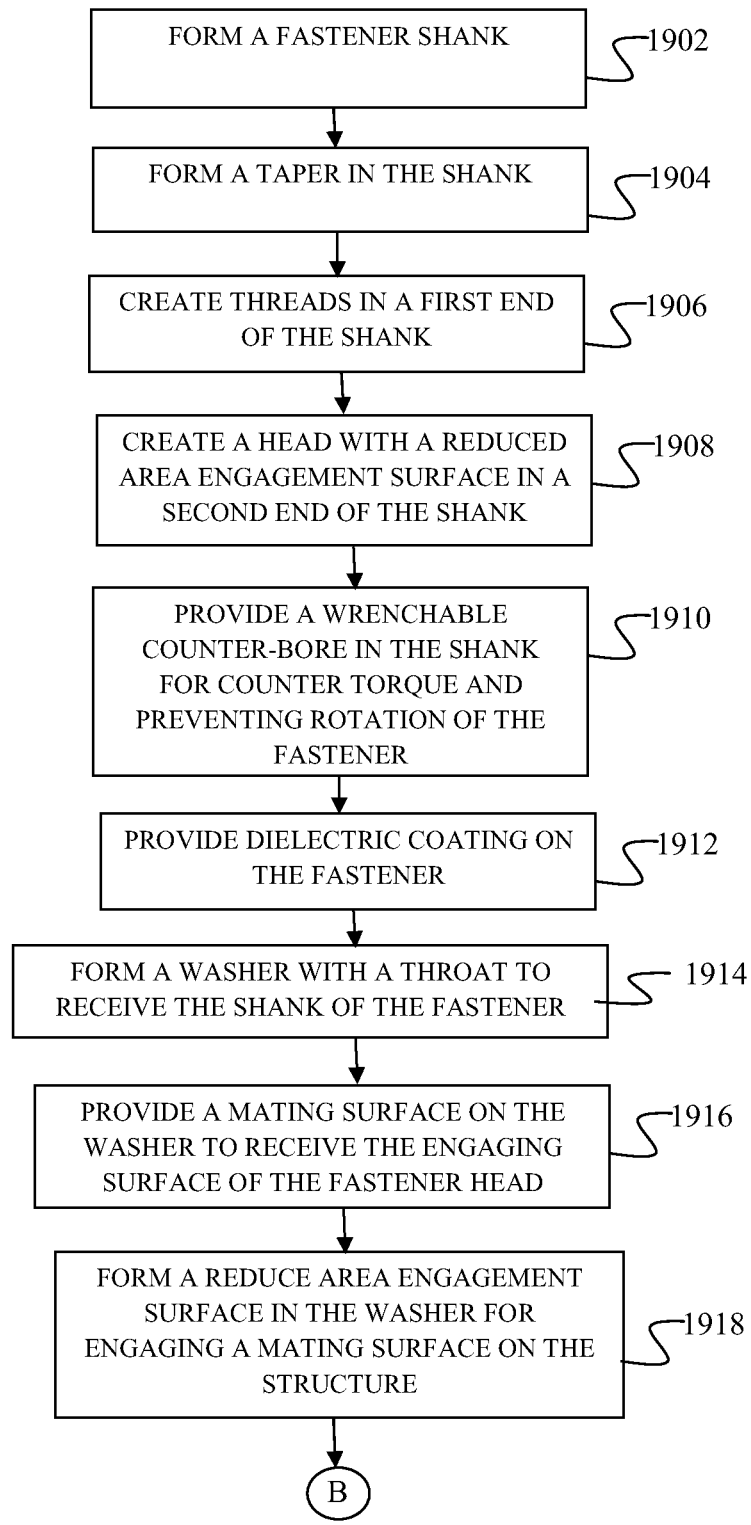
Figure 19:
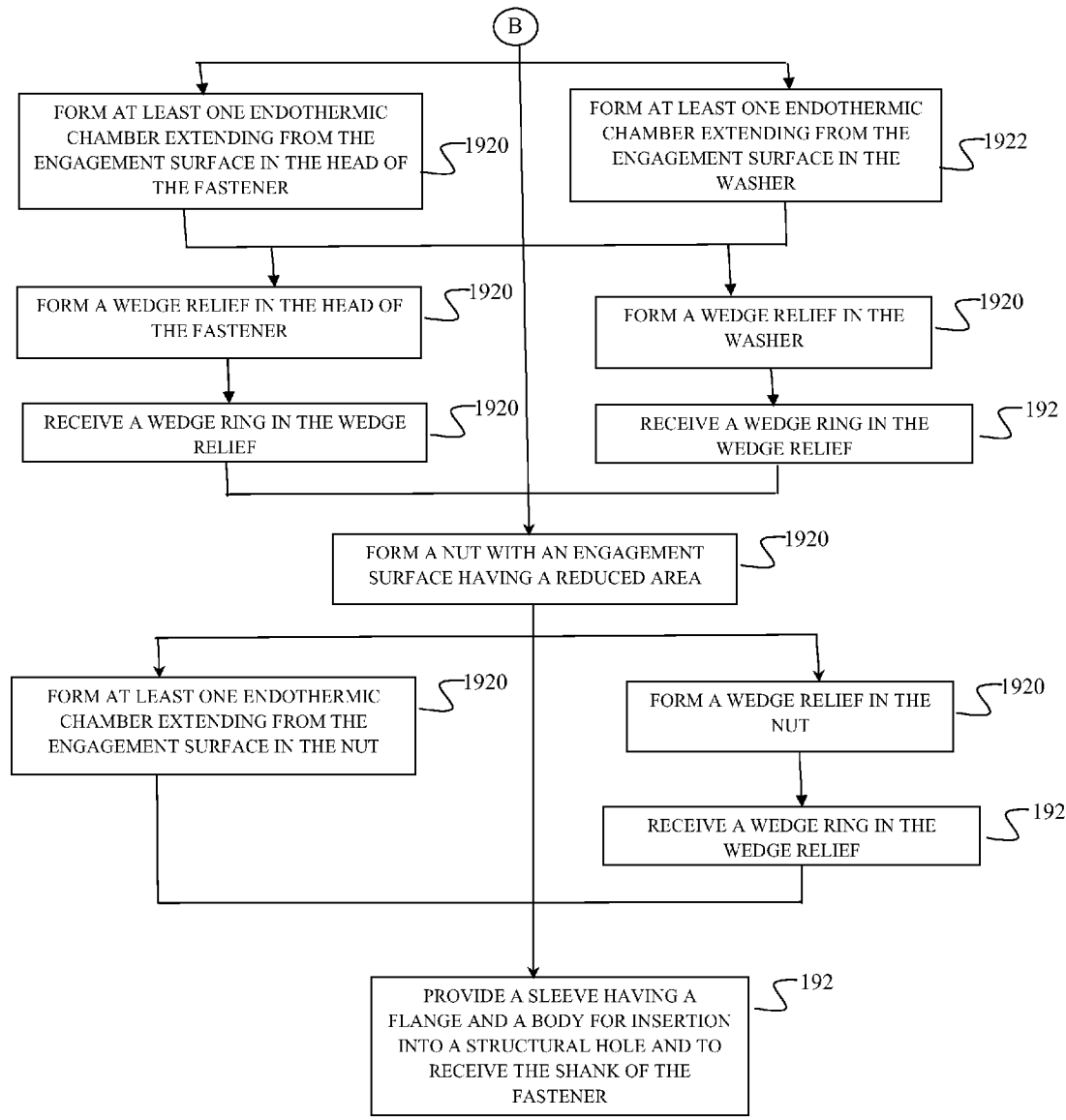

Fabrication of a fastener system with EME protection may be accomplished as shown in FIG. 19. A fastener shank is formed step 1902 and a taper is formed on the shank, step 1904. Threads are created on a first end of the shank, step 1906, and a head having a reduce area engaging surface is formed on a second end of the shank, step 1908. A multi-faceted or multi-lobed wrenchable counter-bore such as a hex bore is provided in the shank for counter torque and preventing rotation of the fastener, step 1910. The fastener is provided with a dielectric coating, step 1912. A washer is formed with a throat to receive the shank of the fastener, step 1914 and provided with a mating surface to receive the engaging surface of the fastener head, step 1916, and a reduce area engagement surface is formed in the washer for engaging a mating surface on the structure, step 1918. At least one endothermic chamber extending from the engagement surface is formed in the head of the fastener, step 1920. At least one endothermic chamber extending from the engagement surface is formed in the washer, step 1922. A wedge relief may be formed in the head of the fastener, step 1924 and a wedge ring is received in the wedge relief, step 1926, providing the reduced engagement area. A wedge relief is formed in the engagement surface of the washer, step 1928 and a wedge ring is received in the wedge relief, step 1930, providing the reduced engagement area. A nut is formed with an engagement surface having a reduced area portion, step 1932. At least one endothermic chamber may be formed extending from the engagement surface of the nut, step 1934. A wedge relief may be formed in the engagement surface of the nut, step 1936, and a wedge ring received in the wedge relief, step 1938. A sleeve having a flange and a body for insertion into a structural hole and to receive the shank of the fastener is provided, step 1940.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A fastener system for composite structure providing electromagnetic energy protection comprising:
    a fastener having a head with an engagement surface and a shank having a threaded end;
    a nut received on the threaded end of the fastener, said nut having an engagement surface;
    wherein at least one of the head engagement surface and the nut engagement surface incorporates a reduced area portion engaging a first mating surface or second mating surface, respectively, thereby creating a pressure contained system to prevent high energy sparks (HPE) and edge sparking during lightning conditions.

2. The fastener system as defined in claim 1 further comprising a washer having an engagement surface and the first mating surface for engaging the engagement surface of the fastener head, wherein at least one of the head engagement surface, the nut engagement surface and the washer engagement surface incorporates a reduced area portion engaging the first mating surface, the second mating surface or a third mating surface, respectively.

3. The fastener system as defined in claim 2 further comprising a sleeve receiving the fastener and having a flange and wherein the first or third mating surface is on the flange.

4. The fastener system as defined in claim 2 wherein the third mating surface is on a structure having a hole receiving the fastener.

5. The fastener system as defined in claim 4 wherein the second mating surface is on the structure opposite the first mating surface.

6. The fastener system as defined in claim 2 wherein at least one of the head of the fastener, the nut and the washer further incorporates at least one endothermic chamber extending from the respective engagement surface.

7. The fastener system as defined in claim 6 wherein the at least one endothermic chamber includes a vertex oriented radially inward at a radially outward junction of the endothermic concentric chamber and the engagement surface.

8. The fastener system as defined in claim 6 wherein the at least one endothermic chamber comprises a first radially inward endothermic chamber and a second radially outward endothermic chamber.

9. The fastener system as defined in claim 8 wherein the first radially inward endothermic chamber and the second radially outward endothermic chamber each include a vertex oriented radially inward at a radially outward junction of the endothermic concentric chamber and the engagement surface.

10. The fastener system as defined in claim 6 wherein the at least one endothermic chamber is a rounded concentric shape.

11. The fastener system as defined in claim 6 wherein the at least one endothermic chamber is a triangular section concentric shape.

12. The fastener system as defined in claim 2 wherein at least one of the head of the fastener, the nut and the washer further incorporates a wedge relief in the respective engagement surface and further comprising a wedge ring received in the wedge relief.

13. The fastener system as defined in claim 12 further comprising a seal ring radially inward from the wedge ring, said seal ring compressing outwardly to urge the wedge ring into sealing contact with the wedge relief.

14. The fastener system as defined in claim 1 wherein the first mating surface is on a structure having a hole receiving the fastener.

15. The fastener system as defined in claim 14 wherein the second mating surface is on the structure opposite the first mating surface.

16. A method for fastener EME protection comprising:
    identifying a hole in a composite structure for insertion of a fastener;

inserting a body of a sleeve in the hole with a flange contacting the surface of the structure;

inserting a fastener having a head with a reduced area engagement surface into the sleeve with the reduced area portion engaging a mating surface on the sleeve flange or a mating surface on the structure thereby creating a pressure contained system to prevent high energy sparks (HPE) and edge sparking during lightning conditions;

torqueing a nut on the fastener, said nut having an engagement surface.

17. The method of claim 16 further comprising:

receiving the fastener in a washer prior to insertion of the fastener in the sleeve;

engaging the reduced area portion on a mating surface on the washer.

18. The method of claim 17 further comprising engaging the mating surface on the structure or flange with a reduced area portion of an engagement surface on the washer.

19. The method of claim 17 further comprising positioning at least one endothermic chamber in the fastener head, washer or nut for HPE entrapment.

20. The method of claim 17 further comprising inserting a wedge ring into a wedge relief in the fastener head, washer or nut to provide a reduced area portion of the fastener engagement surface, washer engagement surface or nut engagement surface.

21. A method for fabrication of a fastener system with EME protection comprising:

forming a fastener shank with a taper;

creating threads on a first end of the shank;

forming a head having a reduced area engaging surface on a second end of the shank;

forming a washer with a throat to receive the shank of the fastener;

providing a mating surface on the washer to receive the engaging surface of the fastener head;

forming a reduced area engagement surface in the washer for engaging a mating surface on a structure, thereby creating a pressure contained system to prevent high energy sparks (HPE) and edge sparking during lightning conditions;

forming a multi-faceted wrenchable counter-bore in the shank for counter torque and preventing rotation of the fastener; and, torqueing a nut on the fastener.

22. The method of claim 21 further comprising providing the fastener with a dielectric coating.

23. The method of claim 21 further comprising forming at least one endothermic chamber extending from the engagement surface is formed in the head of the fastener.

24. The method of claim 21 further comprising forming at least one endothermic chamber extending from the engagement surface in the washer.

25. The method of claim 21 further comprising forming a wedge relief in the head of the fastener and receiving a wedge ring in the wedge relief to provide the reduced engagement area.

26. The method of claim 21 further comprising forming a wedge relief in the engagement surface of the washer and receiving a wedge ring in the wedge relief to provide the reduced engagement area.

27. The method of claim 21 further comprising forming a nut with an engagement surface having a reduced area portion.

28. The method of claim 27 further comprising forming at least one endothermic chamber extending from the engagement surface of the nut.

29. The method of claim 27 further comprising forming a wedge relief in the engagement surface of the nut and receiving a wedge ring in the wedge relief.

30. The method of claim 21 further comprising providing a sleeve having a flange and a body for insertion into a structural hole and to receive the shank of the fastener.

31. A fastener system for composite structure providing electromagnetic energy protection comprising:

a fastener having a head with an engagement surface and a shank having a threaded end;

a sleeve receiving the fastener and having a flange;

a washer intermediate the flange and a first surface on a structure, said washer having an engagement surface;

a nut received on the threaded end of the fastener, said nut having an engagement surface;

wherein at least one of the head engagement surface, washer engagement surface and the nut engagement surface incorporates a reduced area portion engaging a first mating surface or a second mating surface, respectively.

* * * * *